(12) United States Patent
Kigure

(10) Patent No.: US 10,830,789 B2
(45) Date of Patent: Nov. 10, 2020

(54) PHYSICAL QUANTITY SENSOR, PHYSICAL QUANTITY SENSOR DEVICE, ELECTRONIC APPARATUS, AND VEHICLE

(71) Applicant: Seiko Epson Corporation, Tokyo (JP)

(72) Inventor: Shota Kigure, Shiojiri (JP)

(73) Assignee: Seiko Epson Corporation (JP)

( * ) Notice: Subject to any disclaimer, the term of this patent is extended or adjusted under 35 U.S.C. 154(b) by 236 days.

(21) Appl. No.: 15/833,258

(22) Filed: Dec. 6, 2017

(65) Prior Publication Data

US 2018/0156840 A1    Jun. 7, 2018

(30) Foreign Application Priority Data

Dec. 7, 2016 (JP) ................. 2016-237917

(51) Int. Cl.
*G01P 15/135* (2006.01)
*G05D 1/08* (2006.01)
*G01P 15/08* (2006.01)
*G01P 15/125* (2006.01)
*B60T 8/24* (2006.01)
*B60G 17/019* (2006.01)

(52) U.S. Cl.
CPC ............ *G01P 15/135* (2013.01); *G01P 15/08* (2013.01); *G01P 15/125* (2013.01); *G05D 1/0891* (2013.01); *B60G 17/01908* (2013.01); *B60G 2400/05* (2013.01); *B60G 2800/01* (2013.01); *B60T 8/24* (2013.01); *B60T 2230/02* (2013.01); *G01P 2015/0805* (2013.01); *G01P 2015/0814* (2013.01); *G05D 2201/0213* (2013.01)

(58) Field of Classification Search
CPC ................. G01P 15/135; G01P 15/08; G01P 2015/0805; G05D 1/0891; B60G 17/01908; B60G 2400/05; B60G 2800/01; B60T 8/24; B60T 2230/02
USPC ........................................... 73/514
See application file for complete search history.

(56) References Cited

U.S. PATENT DOCUMENTS

| 2003/0190817 | A1 | 10/2003 | Horikawa et al. |
| 2006/0032310 | A1* | 2/2006 | Merassi ............... G01P 15/125 73/514.35 |
| 2010/0212423 | A1* | 8/2010 | Rehle .................. G01P 15/0802 73/504.12 |

(Continued)

FOREIGN PATENT DOCUMENTS

| EP | 2514712 A2 | 10/2012 |
| JP | 2007-139505 A | 6/2007 |

(Continued)

OTHER PUBLICATIONS

Extended European Search Report for Patent Application No. EP17205652.5 dated Feb. 13, 2018 (8 pages).

*Primary Examiner* — Peter J Macchiarolo
*Assistant Examiner* — Monica S Young
(74) *Attorney, Agent, or Firm* — Harness, Dickey & Pierce, P.L.C.

(57) ABSTRACT

A physical quantity sensor includes: a base; wiring disposed in the base; a support that includes a first bonded surface bonded to the base and a second bonded surface bonded to the wiring; a suspension beam connected to the support; and an electrode finger supported by the suspension beam. The support is located between the first bonded surface and the suspension beam and includes a first overhang separated from the base.

19 Claims, 12 Drawing Sheets

(56) References Cited

U.S. PATENT DOCUMENTS

| | | | |
|---|---|---|---|
| 2011/0056295 A1* | 3/2011 | Classen | B81B 7/02 |
| | | | 73/514.32 |
| 2012/0073370 A1* | 3/2012 | Schubert | G01P 15/125 |
| | | | 73/504.12 |
| 2012/0262026 A1* | 10/2012 | Lin | B81B 3/0072 |
| | | | 310/300 |
| 2012/0267150 A1* | 10/2012 | Yoda | G01C 19/5783 |
| | | | 174/257 |
| 2013/0283913 A1* | 10/2013 | Lin | G01P 15/0802 |
| | | | 73/514.32 |
| 2015/0096378 A1* | 4/2015 | Kigure | G01P 1/003 |
| | | | 73/514.32 |
| 2015/0298966 A1* | 10/2015 | Bowles | B81B 7/02 |
| | | | 257/417 |
| 2015/0303153 A1 | 10/2015 | Tanaka | |
| 2016/0130135 A1* | 5/2016 | Kamisuki | B81C 1/00873 |
| | | | 257/415 |
| 2016/0272483 A1 | 9/2016 | Tanaka | |

FOREIGN PATENT DOCUMENTS

| | | |
|---|---|---|
| JP | 2010-238921 A | 10/2010 |
| JP | 2015-206652 A | 11/2015 |
| WO | 03-012859 A1 | 2/2003 |
| WO | WO-2010-032821 A1 | 3/2010 |

\* cited by examiner

PHYSICAL QUANTITY SENSOR, PHYSICAL QUANTITY SENSOR DEVICE, ELECTRONIC APPARATUS, AND VEHICLE

BACKGROUND

1. Technical Field

The present invention relates to a physical quantity sensor, a physical quantity sensor device, an electronic apparatus, and a vehicle.

2. Related Art

A known acceleration sensor capable of detecting acceleration is disclosed in International Publication No. 2010/032821. The acceleration sensor of International Publication No. 2010/032821 includes acceleration sensor elements, and a support substrate and a wiring substrate disposed between the acceleration sensor elements. The acceleration sensor elements include a support unit fixed to the support substrate, a movable electrode unit which is displaceable in a detection axis direction with respect to the support unit, and a fixed electrode unit fixed to the support substrate. With this configuration, the acceleration sensor can detect acceleration based on a change in the electrostatic capacitance formed between the fixed electrode unit and the variable electrode unit.

In the acceleration sensor of International Publication No. 2010/032821, the support unit includes a bond portion bonded on the upper surface of the support unit with an insulation layer and a bond portion bonded on the lower surface of the support unit with a connection metal layer.

Thus, in the acceleration sensor of International Publication No. 2010/032821, the support unit is only bonded with the connection metal layer on the lower surface of the support unit. Therefore, stress caused due to a difference in a coefficient of thermal expansion between the support unit and the connection metal layer easily occurs.

Since the bonding of the support unit and the connection metal layer involves the bonding of silicon and metal, there is also a concern that the bonding strength is not sufficient.

Since the upper surface of the support unit is bonded to the support substrate with the insulation layer interposed therebetween, there is a concern that the bonding stress occurring due to the bonding of the support unit and the support substrate is applied to the support unit.

Therefore, there is a concern that the stability of the bonding of the connection metal layer and the insulation layer of the support unit could be damaged or temperature characteristics could deteriorate.

SUMMARY

An advantage of some aspects of the invention is that it provides a physical quantity sensor, a physical quantity sensor device, an electronic apparatus, and a vehicle capable of reducing deterioration in temperature characteristics while reducing a reduction in a bonding strength of a support.

The invention can be implemented in the following configuration examples.

A physical quantity sensor according to an aspect of the invention includes: a base; a wiring that is disposed in the base; a support that includes a first bond portion bonded to the base and a second bond portion bonded to the wiring; a suspension beam that is connected to the support; and an electrode finger that is supported by the suspension beam. The support is located between the first bond portion and the suspension beam and includes a first overhang portion separated from the base.

With this configuration, it is possible to obtain the physical quantity sensor capable of reducing deterioration in the temperature characteristics while reducing a reduction in the bonding strength of the support.

In the physical quantity sensor according to the aspect of the invention, it is preferable that a length of the first bond portion is longer than a length of the suspension beam in a direction perpendicular to a direction in which the support and the suspension beam are aligned.

With this configuration, it is possible to reduce the deterioration in the temperature characteristics more efficiently.

In the physical quantity sensor according to the aspect of the invention, it is preferable that each corner of the first bond portion has a rounded form.

With this configuration, since stress concentration on each portion of the first bond portion is suppressed, for example, the support base can be prevented from being exfoliated from the base because of the corner becoming a trigger or crack can be prevented from being formed in the support base or can be reduced.

In the physical quantity sensor according to the aspect of the invention, it is preferable that the support includes a second overhang portion that is located opposite to the first bond portion on a side of the first overhang portion and is separated from the base.

With this configuration, it is possible to reduce the deterioration in the temperature characteristics more efficiently.

In the physical quantity sensor according to the aspect of the invention, it is preferable that a length of the first overhang portion is longer than a length of the second overhang portion in a direction in which the first and second overhang portions are aligned.

With this configuration, it is possible to reduce the deterioration in the temperature characteristics more efficiently while suppressing an increase in the size.

In the physical quantity sensor according to the aspect of the invention, it is preferable that the first bond portion includes a notch portion, and the second bond portion is disposed in the notch portion.

With this configuration, a bonding strength of the base and the support base can be sufficiently high, more excellent electric connection between the support base and the wiring can be achieved, and the miniaturization of the physical quantity sensor can be further achieved.

In the physical quantity sensor according to the aspect of the invention, it is preferable that the first bond portion includes a part of an outer edge of the support in the plan view.

With this configuration, it is possible to set the first bond portion to be larger while maintaining the size of the first and second overhang portions without increasing the support base.

A physical quantity sensor device according to an aspect of the invention includes the physical quantity sensor of the invention.

With this configuration, it is possible to obtain the effects of the above-described physical quantity sensor, and thus it is possible to obtain the physical quantity sensor device with high reliability.

An electronic apparatus according to an aspect of the invention includes the physical quantity sensor.

With this configuration, it is possible to obtain the effects of the above-described physical quantity sensor, and thus it is possible to obtain the electronic apparatus with high reliability.

A vehicle according to an aspect of the invention includes the physical quantity sensor.

With this configuration, it is possible to obtain the effects of the above-described physical quantity sensor, and thus it is possible to obtain the vehicle with high reliability.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, a physical quantity sensor, a physical quantity sensor device, an electronic apparatus, and a vehicle according to the invention will be described in detail according to embodiments illustrated in the appended drawings.

First Embodiment

First, a physical quantity sensor according to a first embodiment of the invention will be described.

Figure 1:
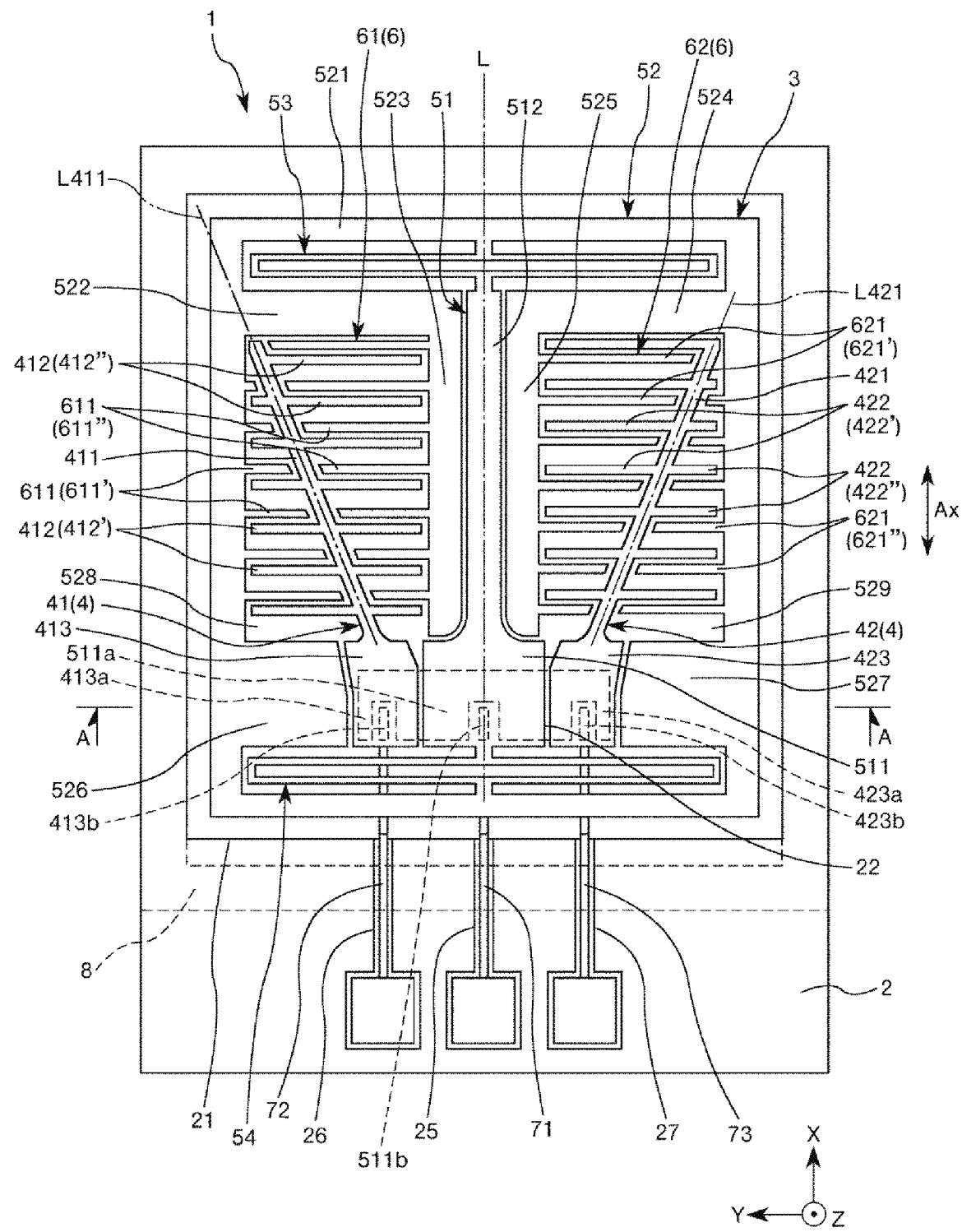
FIG. 1 is a plan view illustrating a physical quantity sensor according to a first embodiment of the invention.
Figure 2:
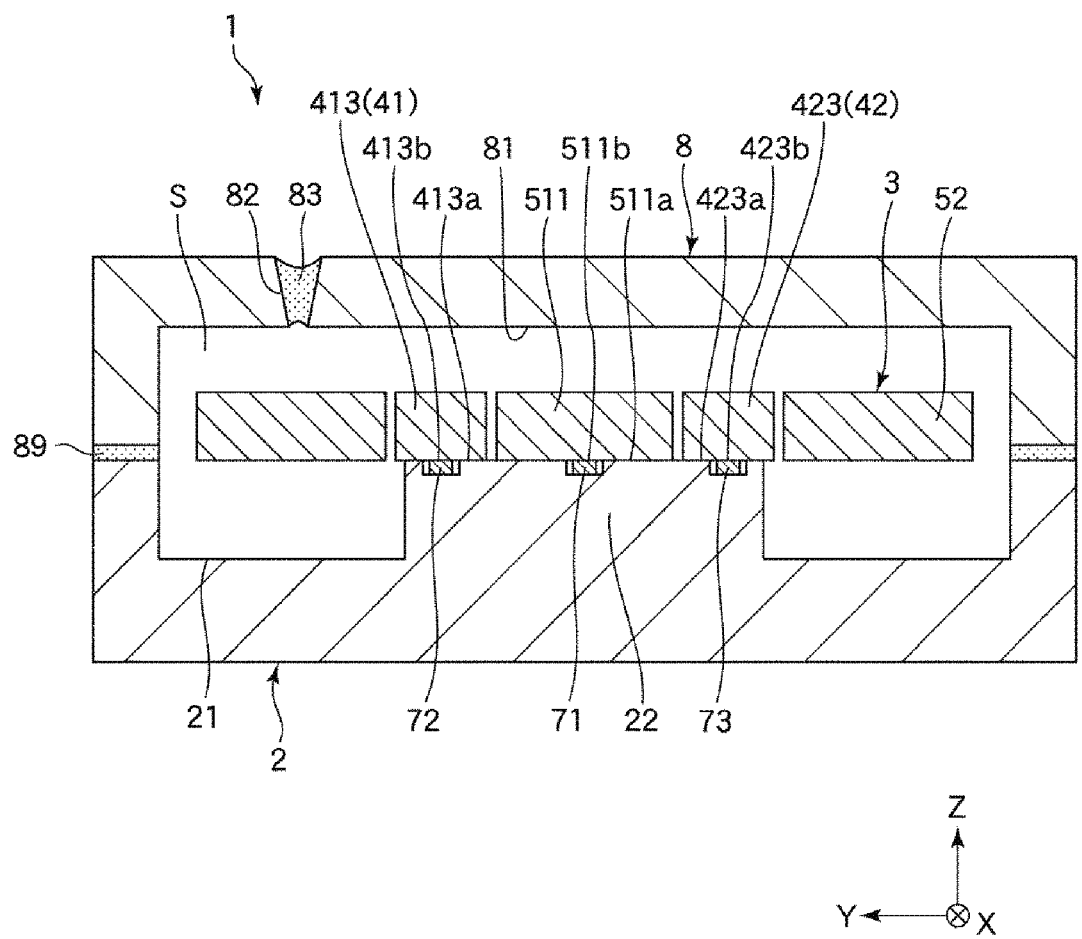
FIG. 2 is a sectional view taken along the line A-A of FIG. 1.
Figure 3:
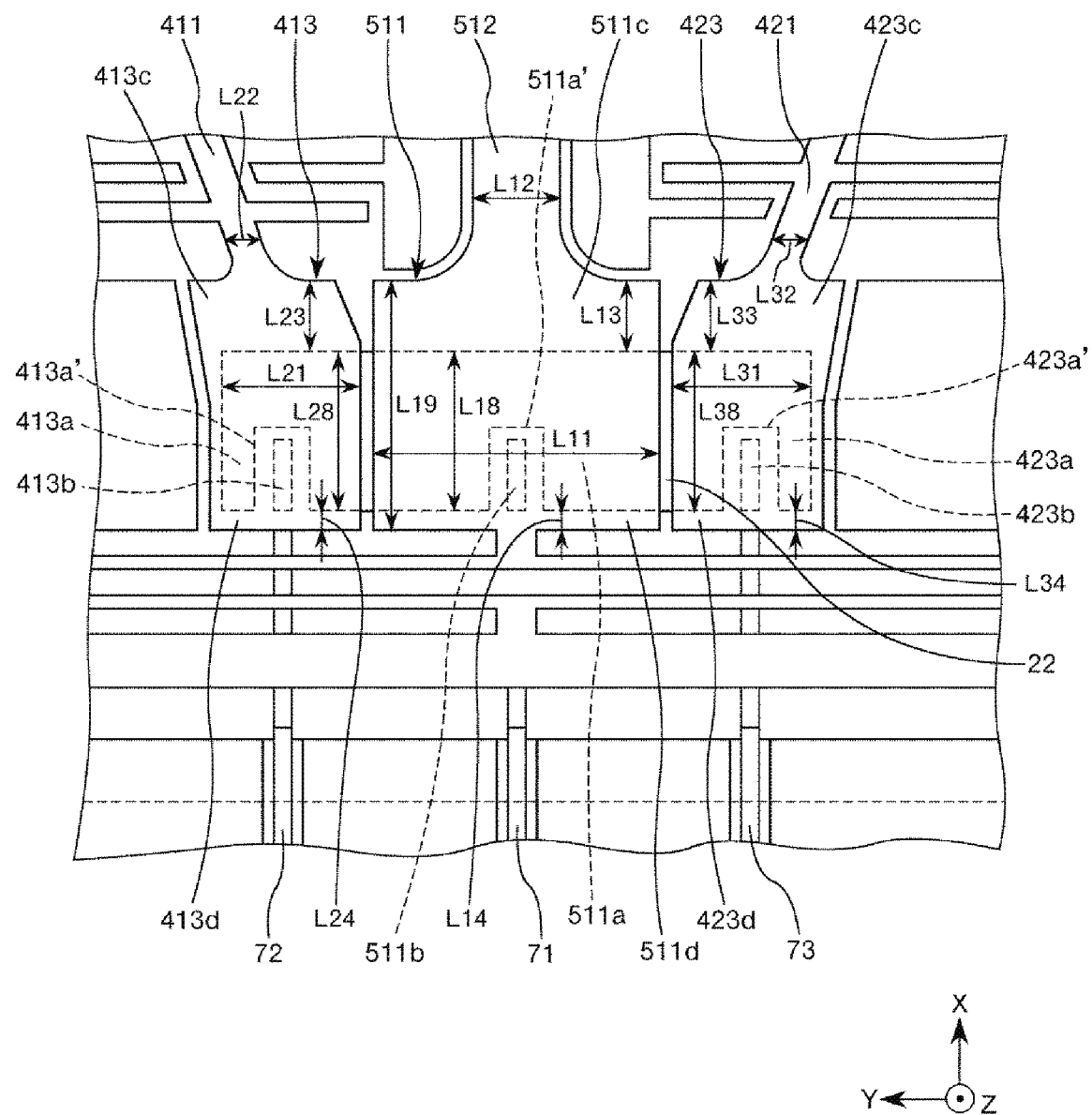
FIG. 3 is a partially enlarged plan view illustrating the physical quantity sensor illustrated in FIG. 1.
Figure 4:
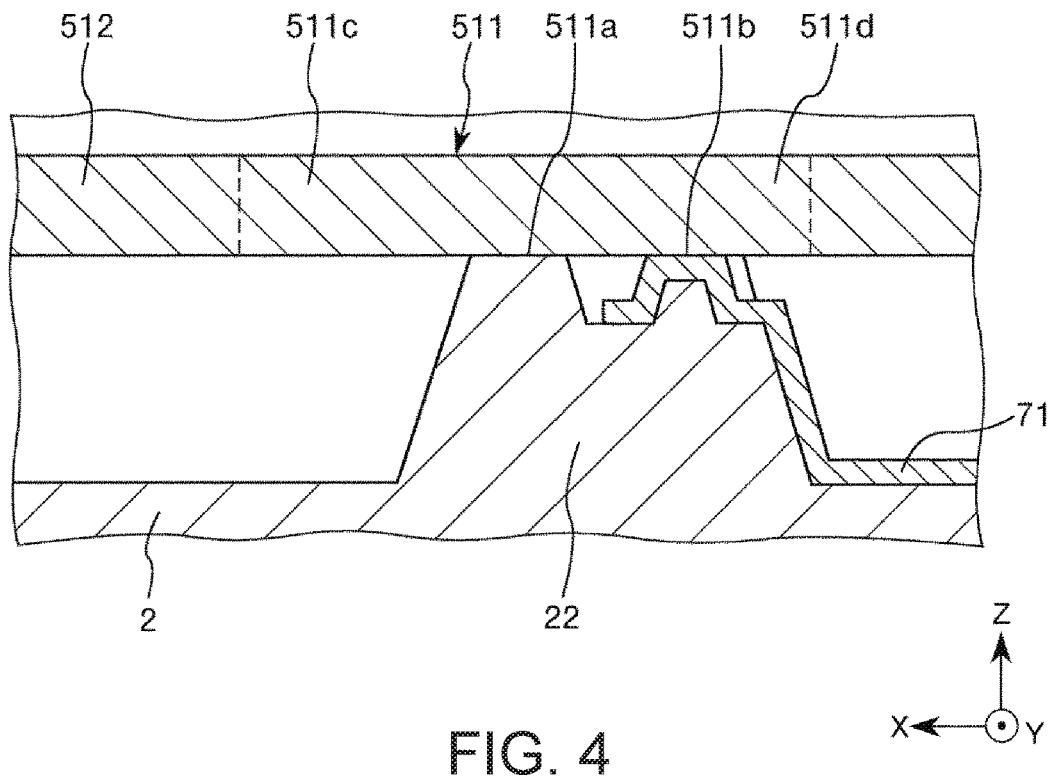
FIG. 4 is a partially enlarged sectional view illustrating the physical quantity sensor illustrated in FIG. 1.
Figure 5:
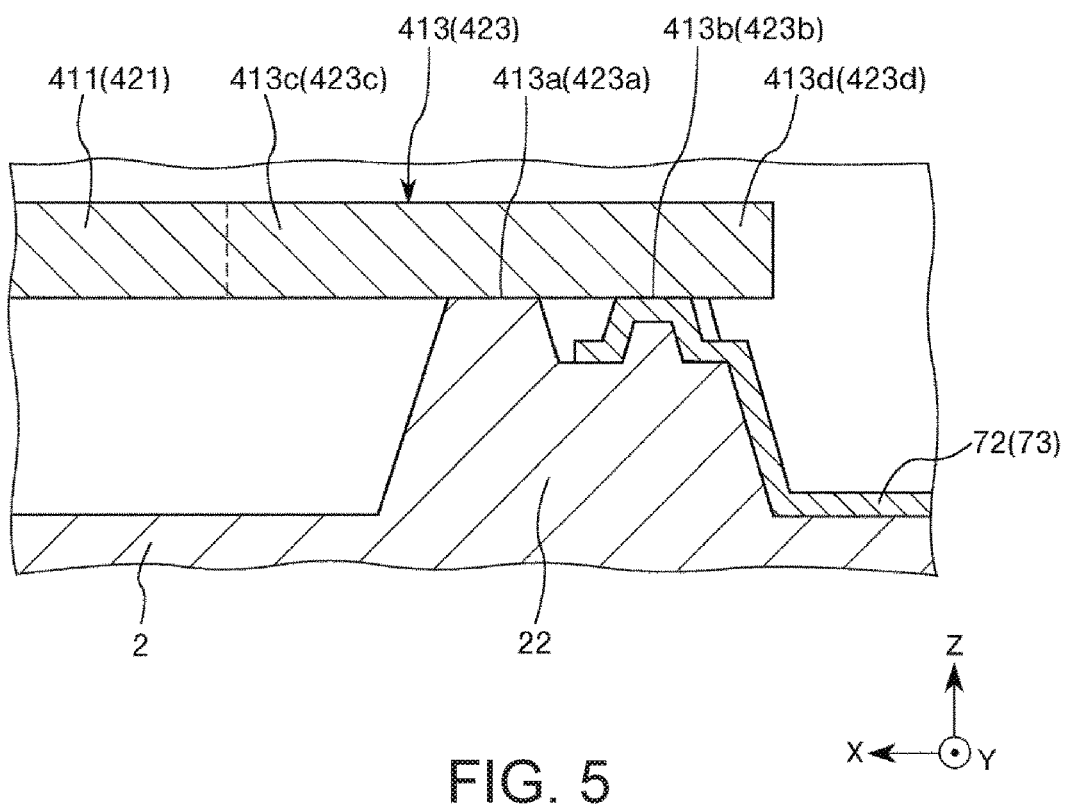
FIG. 5 is a partially enlarged sectional view illustrating the physical quantity sensor illustrated in FIG. 1.
Figure 6:
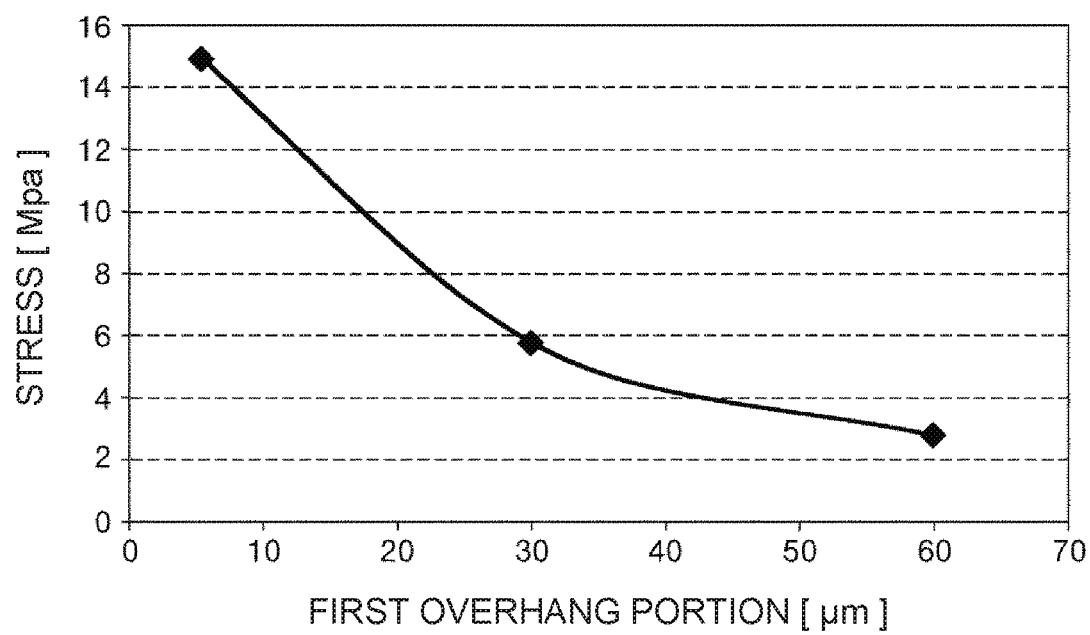
FIG. 6 is a graph illustrating a relation between the length of a first overhang portion and stress applied to a suspension beam.

FIG. 1 is a plan view illustrating a physical quantity sensor according to a first embodiment of the invention. FIG. 2 is a sectional view taken along the line A-A of FIG. 1. FIG. 3 is a partially enlarged plan view illustrating the physical quantity sensor illustrated in FIG. 1. FIGS. 4 and 5 are partially enlarged sectional views illustrating the physical quantity sensor illustrated in FIG. 1. FIG. 6 is a graph illustrating a relation between the length of a first overhang portion and stress applied to a suspension beam. Hereinafter, to facilitate description, the front side of the sheet surface in FIGS. 1 and 3 and the upper side in FIGS. 2, 4, and 5 are referred to a "top" and the rear side of the sheet surface in FIGS. 1 and 3 and the lower side in FIGS. 2, 4, and 5 are referred to as a "bottom". As illustrated in FIGS. 1 to 5, three axes perpendicular to each other are referred to as the X, Y, and Z axes. A direction parallel to the X axis is also referred to as an "X axis direction", a direction parallel to the Y axis is also referred to as a "Y axis direction", and a direction parallel to the Z axis is also referred to as a "Z axis direction. The front end side of the arrow on each axis is referred to as a "positive side" and an opposite side is also referred to as a "negative side".

A physical quantity sensor 1 illustrated in FIG. 1 is an acceleration sensor capable of detecting acceleration Ax in the X axis direction. The physical quantity sensor 1 includes a base 2, a sensor element 3 disposed on the base 2, and a cover 8 bonded to the base 2 to cover the sensor element 3.

Base

As illustrated in FIG. 1, the base 2 is formed in a plate form with a rectangular shape in a plan view. The base 2 includes a depression 21 opened on the upper surface side. In a plan view in the Z axis direction, the depression 21 is formed to be larger than the sensor element 3 to contain the sensor element 3 on the inner side thereof. The depression 21 provides clearance for preventing contact between the sensor element 3 and the base 2.

As illustrated in FIG. 2, the base 2 includes amount 22 that has a projection shape and projects from the bottom surface of the depression 21. The sensor element 3 is bonded to the mount 22. As illustrated in FIG. 1, the base 2 includes grooves 25, 26, 27 opened on the upper surface side. One end of each of the grooves 25, 26, and 27 is located outside the cover 8 and the other end of each of the grooves 25, 26, and 27 is connected to the depression 21.

As the foregoing base 2, for example, a glass substrate formed of a glass material (for example, borosilicate glass such as pyrex glass (registered trademark)) that contains alkali metal ions (mobile ions) can be used. Thus, for example, depending on a constituent material of the cover 8, the base 2 and the cover 8 can be bonded by anodic bonding. Thus, the base 2 and the cover 8 can be bonded rigidly. Since the base 2 with optical transparency can be obtained, a state of the sensor element 3 can be viewed through the base 2 from the outside of the physical quantity sensor 1.

Here, the base 2 is not limited to a glass substrate. For example, a silicon substrate or a ceramic substrate may be used. When a silicon substrate is used, it is preferable to use a silicon substrate with high resistance or to use a silicon substrate in which a silicon oxide film (insulation oxide) is formed on the surface by thermal oxidation from the viewpoint of preventing short-circuiting.

As illustrated in FIG. 1, wirings 71, 72, and 73 are installed in the grooves 25, 26, and 27, respectively. One end of each of the wirings 71, 72, and 73 in the grooves 25, 26, 27 is exposed outside of the cover 8 and functions as a terminal for electrical connection to an external apparatus. As illustrated in FIG. 2, the other end of each of the wirings 71, 72, and 73 is extracted to the mount 22 via the depression 21. The wirings 71, 72, and 73 are electrically connected to the sensor element 3 on the mount 22.

A constituent material of the wirings 71, 72, and 73 is not particularly limited. For example, a metal material such as gold (Au), silver (Ag), platinum (Pt), palladium (Pd), iridium (Ir), copper (Cu), aluminum (Al), nickel (Ni), a titanium (Ti), or tungsten (W), an alloy containing such a metal material, or an oxide-based transparent conductive material such as indium tin oxide (ITO), indium zinc oxide (IZO), ZnO, or IGZO can be exemplified. One or two or more thereof can be combined to be used (for example, as a stacked body of two or more layers).

Cover

As illustrated in FIG. 1, the cover 8 is formed in a plate form with a rectangular shape in a plan view. As illustrated in FIG. 2, the cover 8 includes a depression 81 opened on the lower surface side. The cover 8 is bonded to the base 2 so that the sensor element 3 is accommodated inside the depression 81. An accommodation space S for accommodating the sensor element 3 is formed by the cover 8 and the base 2.

As illustrated in FIG. 2, the cover 8 includes a communication hole 82 allowing communication between the inside and the outside of the accommodation space S. Thus, the interior of the accommodation space S can be replaced with a desired atmosphere via the communication hole 82. A sealing member 83 is disposed in the communication hole 82 and the communication hole 82 is sealed by the sealing member 83.

The sealing member 83 is not particularly limited as long as the communication hole 82 can be sealed. For example, any of various alloys such as a gold (Au)/tin (Sn)-based alloy, a gold (Au)/germanium (Ge)-based alloy, and gold (Au)/aluminum (Al)-based alloy or a glass material such as low-melting point glass can be used.

The accommodation space S preferably contains an inert gas such as nitrogen, helium, or argon and is preferably nearly at atmospheric pressure at a use temperature (about −40° C. to 80° C.). When the accommodation space S is at atmospheric pressure, viscous resistance increases, a damping effect is obtained, and thus vibration of a movable portion 52 included in the sensor element 3 can be converted (stopped) quickly. Therefore, the acceleration detection precision of the physical quantity sensor 1 is improved.

In the embodiment, the cover 8 is configured as a silicon substrate. Here, the cover 8 is not limited to a silicon substrate. For example, a glass substrate or a ceramic substrate may be used. A method of bonding the base 2 to the cover 8 is not particularly limited and may be appropriately selected depending on the materials of the base 2 and the cover 8. For example, anodic bonding, activation bonding in which bonding surfaces activated by plasma irradiation are bonded, bonding by a bonding material such as a glass frit, and diffusion bonding in which metal films formed on the upper surface of the base 2 and the lower surface of the cover 8 are bonded can be exemplified.

In the embodiment, as illustrated in FIG. 2, the base 2 and the cover 8 are bonded with a glass frit 89 (low-melting point glass) which is an example of a bonding material interposed therebetween. In a state in which the base 2 and the cover 8 are superimposed, the inside and the outside of the accommodation space S communicate via the grooves 25, 26, and 27. However, by using the glass frit 89, it is possible to bond the base 2 to the cover 8 and seal the grooves 25, 26, and 27. Thus, the accommodation space S can be airtight-sealed more easily. When the base 2 and the cover 8 are bonded by anodic bonding or the like (a bonding method in which the grooves 25, 26, and 27 may not be sealed), the grooves 25, 26, and 27 can be blocked by a $SiO_2$ film formed by a CVD method, for example, using TEOS (tetraethoxysilane).

Sensor Element

As illustrated in FIG. 1, the sensor element 3 includes a fixed electrode 4 fixed to the base 2, a support 51 fixed to the base 2, a movable member 52 displaceable with respect to the support 51 in the X axis direction, springs 53 and 54 connecting the support 51 and the movable member 52, and a movable electrode 6 in the movable member 52. The fixed electrode 4 includes a first fixed electrode 41 and a second fixed electrode 42. The movable electrode 6 includes a first movable electrode 61 and a second movable electrode 62. The support 51, the movable member 52, the springs 53 and 54, and the movable electrode 6 are integrated together.

The sensor element 3 can be formed, for example, by patterning a silicon substrate doped with impurities such as phosphorus (P) or boron (B). The sensor element 3 is bonded to the base 2 (the mount 22) by anodic bonding. Here, the method of bonding the material of the sensor element 3 or the sensor element 3 to the base 2 is not particularly limited.

The thickness of the sensor element 3 is not particularly limited. For example, in the embodiment, the thickness of the sensor element 3 is equal to or greater than 20 μm and equal to or less than 50 μm. Thus, the sensor element 3 can be configured to be thin while sufficiently maintaining a mechanical strength of the sensor element 3. Therefore, it is possible to achieve miniaturization (low profile) of the physical quantity sensor 1.

As illustrated in FIG. 1, the support 51 is located between the first fixed electrode 41 and the second fixed electrode 42. The support 51 includes a support body 511 fixed to the mount 22 and a suspension arm 512 connected to the support body 511. As illustrated in FIG. 2, the support 51 is electrically connected to a wiring 71 in the support body 511.

The suspension arm 512 is located on a positive side of the X axis direction with respect to the support body 511 and is formed in a rectangular shape extending in the X axis direction. The end of the suspension arm 512 on the negative side of the X axis direction is connected to the support 511. The width (a distance in the Y axis direction) of the suspension arm 512 is less than the width (a distance in the Y axis direction) of the support body 511. Thus, it is possible to achieve miniaturization of the suspension arm 512 and increase the mass of the movable member 52 without increasing the size of the movable member 52 located in the periphery of the suspension arm 512. Therefore, it is possible to detect a physical quantity with higher precision while suppressing an increase in the size of the sensor element 3. Hereinafter, in a plan view in the Z axis direction, an axis bisecting the suspension arm 512 in the Y axis direction is assumed to be a central axis L.

As illustrated in FIG. 1, the movable member 52 is formed in a frame shape in a plan view in the Z axis direction and surrounds the support 51, the springs 53 and 54, and the first fixed electrode 41, and the second fixed electrode 42. By forming the movable member 52 in the frame shape, it is possible to further increase the mass of the movable member 52 while suppressing the size of the movable member 52. Therefore, it is possible to detect a physical quantity with higher precision while suppressing an increase in the size of the sensor element 3.

The movable member 52 includes a first opening 528 and second opening 529 arranged in the Y axis direction. The first fixed electrode 41 and the first movable electrode 61 are disposed in the first opening 528, and the second fixed electrode 42 and the second movable electrode 62 are disposed in the second opening 529.

The shape of the movable member 52 will now be described in more detail. The movable member 52 includes a frame 521 that surrounds the support 51, the springs 53 and 54, the first fixed electrode 41, and the second fixed electrode 42; a first Y axis beam 522 that is located on the positive side of the X axis direction with respect to the first opening 528 and extends from the frame 521 on the negative side of the Y axis direction; a first X axis beam 523 that extends from the front end of the first Y axis beam 522 on the negative side of the X axis direction; a second Y axis beam 524 that is located on the positive side of the X axis direction with respect to the second opening 529 and extends from the frame 521 on the positive side of the Y axis direction; and a second X axis beam 525 that extends from the front end of the second Y axis beam 524 on the negative side of the X axis direction. The first Y axis beam 522 and the second Y axis beam 524 are disposed near the spring 53 and extend alongside the spring 53. The first X axis beam 523 and the second X axis beam 525 are located near the support 51 and are disposed alongside the support arm 512.

The movable member 52 includes a first protrusion 526 that protrudes from the frame 521 in the first opening 528 to be positioned in a remaining space of the first opening 528 and a second protrusion 527 that protrudes from the frame 521 in the second opening 529 to be positioned in a remaining space of the second opening 529. By forming the first protrusion 526 and the second protrusion 527 in this way, it is possible to further increase the mass of the movable member 52 without increasing the size of the movable member 52. Therefore, the physical quantity sensor 1 has higher sensitivity.

As illustrated in FIG. 1, the spring 53 connects the end of the movable member 52 on the positive side of the X axis direction to the end of the support 51 on the positive side of the X axis direction. The spring 54 connects the end of the movable member 52 on the negative side of the X axis direction to the end of the support 51 on the negative side of the X axis direction. Thus, since the movable member 52 is supported on both sides of the X axis direction, an attitude and behavior of the movable member 52 are stabilized. Therefore, it is possible to detect acceleration with higher precision.

As illustrated in FIG. 1, the fixed electrode 4 includes the first fixed electrode 41 located in the first opening 528 and the second fixed electrode 42 located in the second opening 529. The first fixed electrode 41 and the second fixed electrode 42 are disposed to be arranged in the Y axis direction.

The first fixed electrode 41 includes a support base 413 that is fixed to the mount 22, a suspension beam 411 that is supported by the support base 413, and a plurality of first fixed electrode fingers 412 that extend from the suspension beam 411 on both sides of the Y axis direction. As illustrated in FIG. 2, the first fixed electrode 41 is electrically connected to the wiring 72 in the support base 413. The support base 413, the suspension beam 411, and the first fixed electrode fingers 412 are integrally formed.

The suspension beam 411 is formed in a rectangular rod shape and one end of the suspension beam 411 is connected to the support base 413. The suspension beam 411 extends in an inclined direction with respect to the X and Y axes in the plan view in the Z axis direction. More specifically, the suspension beam 411 is inclined so that a separation distance from the central axis L increases toward the front end side of the suspension beam 411. By disposing the suspension beam 411 in this way, the support base 413 is easily disposed near the support body 511. An inclination degree of an axis L411 of the suspension beam 411 with respect to the X axis is not particularly limited, is preferably equal to or greater than 10° and equal to or less than 45°, and is more preferably equal to or greater than 10° and equal to or less than 30°.

Thus, it is possible to suppress an expansion of the first fixed electrode 41 in the Y axis direction and it is possible to achieve miniaturization of the sensor element 3.

The first fixed electrode fingers 412 extend from the suspension beam 411 on both sides of the Y axis direction. That is, the first fixed electrode fingers 412 include a first fixed electrode finger 412' located on the positive side of the Y axis direction with respect to the suspension beam 411 and a first fixed electrode finger 412' located on the negative side of the Y axis direction. A plurality of first fixed electrode fingers 412' and 412' are installed to be separated from each other in the X axis direction.

The length (the length in the Y axis direction) of the plurality of first fixed electrode fingers 412' gradually decreases on the positive side of the X axis direction. On the other hand, the length (the length in the Y axis direction) of the plurality of first fixed electrode fingers 412" gradually increases on the positive side of the X axis direction.

As illustrated in FIG. 1, the second fixed electrode 42 includes a support base 423 that is fixed to the mount 22, a suspension beam 421 that is supported by the support base 423, and a plurality of second fixed electrode fingers 422 that extend from the suspension beam 421 on both sides of the Y axis direction. As illustrated in FIG. 2, the second fixed electrode 42 is electrically connected to the wiring 73 in the support base 423. The support base 423, the suspension beam 421, and the second fixed electrode fingers 422 are integrally formed.

The suspension beam 421 is formed in a rectangular rod shape and one end of the suspension beam 421 is connected to the support base 423. The suspension beam 421 extends in an inclined direction with respect to the X and Y axes in the plan view in the Z axis direction. More specifically, the suspension beam 421 is inclined so that a separatation distance from the central axis L increases toward the front end side of the suspension beam 421. By disposing the suspension beam 421 in this way, the support base 423 is easily disposed near the support body 511. An inclination degree of an axis L421 of the suspension beam 421 with respect to the X axis is not particularly limited, is preferably equal to or greater than 10° and equal to or less than 45°, and is more preferably equal to or greater than 10° and equal to or less than 30°. Thus, it is possible to suppress an expansion of the second fixed electrode 42 in the Y axis direction and it is possible to achieve miniaturization of the sensor element 3.

The second fixed electrode fingers 422 extend from the suspension beam 421 on both sides of the Y axis direction. That is, the second fixed electrode fingers 422 include a second fixed electrode finger 422' located on the positive side of the Y axis direction with respect to the suspension beam 421 and a second fixed electrode finger 422" located on the negative side of the Y axis direction. A plurality of second fixed electrode fingers 422' and 422" are installed to be separated from each other in the X axis direction.

The length (the length in the Y axis direction) of the plurality of second fixed electrode fingers 422' gradually increases on the positive side of the X axis direction. On the other hand, the length (the length in the Y axis direction) of the plurality of second fixed electrode fingers 422" gradually decreases on the positive side of the X axis direction.

As illustrated in FIG. 1, the movable electrode 6 includes the first movable electrode 61 located in the first opening 528 and the second movable electrode 62 located in the second opening 529.

The first movable electrode 61 includes a plurality of first movable electrode fingers 611 that are located on both sides of the suspension beam 411 in the Y axis direction and extend in the Y axis direction. That is, the first movable electrode fingers 611 include a first movable electrode finger 611' that is located on the positive side of the Y axis direction with respect to the suspension beam 411 and a first movable electrode finger 611' that is located on the negative side of the Y axis direction. A plurality of first movable electrode fingers 611' and 611" are installed to be separated from each other in the X axis direction.

Each first movable electrode finger 611 is located on the positive side of the X axis direction with respect to the corresponding first fixed electrode finger 412 and faces the first fixed electrode finger 412 with a gap interposed therebetween.

The length (the length in the Y axis direction) of the plurality of first movable electrode fingers 611' gradually decreases on the positive side of the X axis direction. On the other hand, the length (the length in the Y axis direction) of the plurality of first movable electrode fingers 611' gradually increases on the positive side of the X axis direction.

As illustrated in FIG. 1, the second movable electrode 62 includes a plurality of second movable electrode fingers 621 that are located on both sides of the suspension beam 421 in the Y axis direction and extend in the Y axis direction. That is, the second movable electrode fingers 621 include a second movable electrode finger 621' that is located on the positive side of the Y axis direction with respect to the suspension beam 421 and a second movable electrode finger 621" that is located on the negative side of the Y axis direction. A plurality of second movable electrode fingers 621' and 621" are installed to be separated from each other in the X axis direction.

Each second movable electrode finger 621 is located on the negative side of the X axis direction with respect to the corresponding second fixed electrode finger 422 and faces the second fixed electrode finger 422 with a gap interposed therebetween.

The length (the length in the Y axis direction) of the plurality of second movable electrode fingers 621' gradually increases on the positive side of the X axis direction. On the other hand, the length (the length in the Y axis direction) of the plurality of second movable electrode fingers 621" gradually decreases on the positive side of the X axis direction.

The configuration of the physical quantity sensor 1 has been described above. When acceleration is applied to the physical quantity sensor 1 in the X axis direction, the movable member 52 is displaced in the X axis direction based on the magnitude of the acceleration while elastically deforming the springs 53 and 54. With the displacement, the gap between the first movable electrode fingers 611 and the first fixed electrode fingers 412 and the gap between the second movable electrode fingers 621 and the second fixed electrode fingers 422 are changed. With the displacement, the magnitude of electrostatic capacitance between the first movable electrode fingers 611 and the first fixed electrode fingers 412 and the magnitude of electrostatic capacitance between the second movable electrode fingers 621 and the second fixed electrode fingers 422 are changed. Therefore, it is possible to detect acceleration based on the change in the electrostatic capacitance.

In particular, in the embodiment, each first movable electrode finger 611 is located on the positive side of the X axis direction with respect to the corresponding first fixed electrode finger 412. In contrast, each second movable electrode finger 621 is located on the negative side of the X axis direction with respect to the corresponding second fixed electrode finger 422. That is, each first movable electrode finger 611 is located on one side of the X axis direction (a first direction) with respect to the paired first fixed electrode finger 412 and each second movable electrode finger 621 is located on the other side of the X axis direction (the first direction) with respect to the paired second fixed electrode finger 422. Therefore, when acceleration is applied in the X axis direction, the gap between the first movable electrode finger 611 and the first fixed electrode finger 412 is shortened and the gap between the second movable electrode finger 621 and the second fixed electrode finger 422 is widened. In contrast, the gap between the first movable electrode finger 611 and the first fixed electrode finger 412 is widened and the gap between the second movable electrode finger 621 and the second fixed electrode finger 422 is shortened. Accordingly, by performing differential calculation on a first detection signal obtained between the first fixed electrode finger 412 and the first movable electrode finger 611 and a second detection signal obtained between the second fixed electrode finger 422 and the second movable electrode finger 621, it is possible to cancel noise, and thus it is possible to detect acceleration with higher precision.

In the physical quantity sensor 1, it is possible to shorten the lengths of the electrode fingers 412, 422, 611, and 621 while forming sufficiently large electrostatic capacitance between the first fixed electrode finger 412 and the first movable electrode finger 611 and between the second fixed electrode finger 422 and the second movable electrode finger 621. Therefore, excellent detection precision can be achieved and the likelihood of damage of the electrode fingers 412, 422, 611, and 621 is suppressed. Thus, the physical quantity sensor 1 is capable of achieving excellent shock resistance. As the damage of the electrode fingers 412, 422, 611, and 621 is suppressed, the thicknesses of the electrode fingers 412, 422, 611, and 621 can be thinned. Thus, it is possible to achieve miniaturization of the physical quantity sensor 1.

In particular, in the physical quantity sensor 1, the suspension beams 411 and 421 extend in an inclined direction with respect to the X and Y axes, respectively. Thus, since the much shorter first fixed electrode finger 412 is included in the plurality of shorter first fixed electrode fingers 412, it is more difficult for the first fixed electrode 41 to be damaged on the whole. Similarly, since the much shorter second electrode finger 422 is included in the plurality of shorter second fixed electrode fingers 422, it is more difficult for the second fixed electrode 42 to be damaged on the whole. The same applies to the first movable electrode fingers 611 and the second movable electrode fingers 621. Therefore, damage of the electrode fingers 412, 422, 611, and 621 is more efficiently suppressed and the physical quantity sensor 1 is capable of achieving more excellent shock resistance.

Next, a configuration of a bond between the support 51 and the mount 22 (the base 2), a bond between the first fixed electrode 41 and the mount 22 (the base 2), and a bond between the second fixed electrode 42 and the mount 22 (the base 2) will be described in detail.

As illustrated in FIGS. 3 and 4, the support body 511 of the support 51 includes a first bonded surface 511a bonded to the mount 22 and a second bonded surface 511b bonded to the wiring 71. As described above, since the sensor element 3 and the base 2 are directly bonded by anodic bonding, the peripheral shape of the first bonded surface 511a is substantially the same as the shape of the surface area of the support body 511 contacting the mount 22. Since the support body 511 and the wiring 71 are directly bonded to each other with no member interposed therebetween, the peripheral shape of the second bonded surface 511b is substantially the same as the shape of the surface area of the support body 511 contacting the wiring 71.

The support body 511 includes a first overhang 511c that is located between the first bonded surface 511a and the suspension arm 512 and is separated from the base 2. In this way, since the support body 511 includes the first overhang 511c, thermal stress occurring in the structure near the first bonded surface 511a (thermal stress caused due to a difference in a coefficient of thermal expansion between glass which is the constituent material of the base 2 and silicon which is the constituent material of the sensor element 3 and the same applies below) is absorbed and alleviated by the first overhang 511c and is rarely delivered to the suspension arm 512. Therefore, undesired deformation of the suspension arm 512 caused due to thermal stress is suppressed.

As illustrated in FIGS. 3 and 5, the support base 413 of the first fixed electrode 41 includes a first bonded surface 413a bonded to the mount 22 and a second bonded surface 413b bonded to the wiring 72. As described above, since the sensor element 3 and the base 2 are directly bonded by anodic bonding, the peripheral shape of the first bonded surface 413a is substantially the same as the shape of the surface area of the support base 413 contacting the mount 22. Since the support base 413 and the wiring 72 are directly bonded to each other with no member interposed therebetween, the peripheral shape of the second bonded surface 413b is substantially the same as the shape of the surface area of the support base 413 contacting the wiring 72.

The support base 413 includes a first overhang 413c that is located between the first bonded surface 413a and the suspension beam 411 and is separated from the base 2. In this way, since the support base 413 includes the first overhang 413c, thermal stress occurring in the structure near the first bonded surface 413a is absorbed and alleviated by the first overhang 413c and is rarely delivered to the suspension beam 411. Therefore, undesired deformation of the suspension beam 411 caused due to thermal stress is suppressed.

As illustrated in FIGS. 3 and 5, the support base 423 of the second fixed electrode 42 includes a first bonded surface 423a bonded to the mount 22 and a second bonded surface 423b bonded to the wiring 73. As described above, since the sensor element 3 and the base 2 are directly bonded by anodic bonding, the peripheral shape of the first bonded surface 423a is substantially the same as the shape of the surface area of the support base 423 contacting the mount 22. Since the support base 423 and the wiring 73 are directly bonded to each other with no member interposed therebetween, the peripheral shape of the second bonded surface 423b is substantially the same as the shape of the surface area of the support base 423 contacting the wiring 73.

The support base 423 includes a first overhang 423c that is located between the first bonded surface 423a and the suspension beam 421 and is separated from the base 2. In this way, since the support base 423 includes the first overhang 423c, thermal stress occurring in the structure near the first bonded surface 423a is absorbed and alleviated by the first overhang 423c and is rarely delivered to the suspension beam 421. Therefore, undesired deformation of the suspension beam 421 caused due to thermal stress is suppressed.

By suppressing deformation of the suspension beams 512, 411, and 421 caused due to the thermal stress in this way, it is possible to suppress a change in relative positions of the first movable electrode fingers 611 and the first fixed electrode fingers 412 and a change in relative positions of the second movable electrode fingers 621 and the second fixed electrode fingers 422 in a natural state (a stopped state with no acceleration Ax). Therefore, it is possible to suppress a change in electrostatic capacitance between the first movable electrode fingers 611 and the first fixed electrode fingers 412 and a change in electrostatic capacitance between the second movable electrode fingers 621 and the second fixed electrode fingers 422 in the natural state caused due to environmental temperature fluctuations. Thus, it is possible to suppress deterioration in the temperature characteristics of the physical quantity sensor 1 and it is possible to detect acceleration Ax with higher precision.

Since the support body 511 includes the second bonded surface 511b, excellent electric connection of the support body 511 and the wiring 71 is achieved while sufficiently ensuring a bonding strength of the support body 511 and the mount 22. Similarly, since the support base 413 includes the second bonded surface 413b, excellent electric connection of the support base 413 and the wiring 72 is achieved while sufficiently ensuring a bonding strength of the support base 413 and the mount 22. In addition, since the support base 423 includes the second bonded surface 423b, excellent electric connection of the support base 423 and the wiring 73 is achieved while sufficiently ensuring a bonding strength of the support base 423 and the mount 22.

As described above, the physical quantity sensor 1 includes the base 2, the wirings 71, 72, and 73 that are disposed in the base 2, the support body 511 that includes the first bonded surface 511a bonded to the base 2 and the second bonded surface 511b bonded to the wiring 71, the support base 413 that includes the first bonded surface 413a bonded to the base 2 and the second bonded surface 413b bonded to the wiring 72, the support base 423 that includes the first bonded surface 423a bonded to the base 2 and the second bonded surface 423b bonded to the wiring 73, the suspension arm 512 that is connected to the support body 511, the suspension beam 411 that is connected to the support base 413, the suspension beam 421 that is connected to the support base 423, the first movable electrode fingers 611 and the second movable electrode fingers 621 that serve as electrode fingers supported by the suspension arm 512, the first fixed electrode fingers 412 that serve as electrode fingers supported by the suspension beam 411, and the second fixed electrode fingers 422 that serve as electrode fingers supported by the suspension beam 421. The support body 511 includes the first overhang 511c that is located between the first bonded surface 511a and the suspension arm 512 and is separated from the base 2. The support base 413 includes the first overhang 413c that is located between the first bonded surface 413a and the suspension beam 411 and is separated from the base 2. The support base 423 includes the first overhang 423c that is located between the first bonded surface 423a and the suspension beam 421 and is separated from the base 2. In this configuration, as described above, it is possible to obtain the physical quantity sensor 1 capable of suppressing deterioration in the temperature characteristics while suppressing the deterioration in the bonding strength of the support bases 511, 413, and 423.

A length L13 of the first overhang 511c in the X axis direction (overhang direction) is not particularly limited and differs depending on the size of the support body 511 or the like. For example, when L19 is the length of the support body 511 in the X axis direction, L13 may be equal to or greater than 0.2×L19; and equal to or less than 0.4×L19. Thus, the above-described effect (that is, the effect of absorbing and alleviating the thermal stress) can be sufficiently obtained. Further, the considerable (unnecessary) increase in the size of the first overhang 511c can be prevented, deterioration in shock characteristics (a mechanical strength of the first overhang 511c) can be suppressed, and the size of the first bonded surface 511a can be sufficiently ensured, the bonding strength of the support body 511 and the mount 22 can be maintained sufficiently high. The same applies to a length L23 of the first overhang 413c in the X axis direction and a length L33 of the first overhang 423c in the X axis direction.

A length L18 of the first bonded surface 511a in the X axis direction (overhang direction) is not particularly limited and differs depending on the size of the support body 511. For example, when L19 is the length of the support body 511 in the X axis direction, L18 may be equal to or greater than 0.4×L19 and equal to or less than 0.7×L19. Thus, the size of the first bonded surface 511a can be sufficiently ensured, the bonding strength of the support body 511 and the mount 22 can be maintained sufficiently high, it can be ensured that the length L13 of the first overhang 511c is sufficiently long, and the above-described effect (that is, the effect of absorbing and alleviating the thermal stress) can be sufficiently obtained. The same applies to a length L28 of the first bonded surface 413a in the X axis direction and a length L38 of the first bonded surface 423a in the X axis direction.

Here, the length L19 of the support body 511 in the X axis direction is not particularly limited. For example, the length L19 of the support body 511 is preferably equal to or greater than 80 µm and equal to or less than 120 µm and more preferably equal to or greater than 90 µm and equal to or less than 110 µm. Thus, it is possible to ensure that the first bonded surface 511a and the first overhang 511c are each sufficiently long while suppressing the size of the support body 511. In this case, the length L13 of the first overhang 511c is not particularly limited. For example, the length L13 of the first overhang 511c is preferably equal to or greater than 16 µm and equal to or less than 48 µm and more preferably equal to or greater than 18 µm and equal to or less than 44 µm. Here, FIG. 6 is a graph illustrating a relation between the length L13 of the first overhang 511c and stress applied to the suspension arm 512 in a model in which the length L19 of the support body 511 is 100 µm. As understood from this drawing, the stress is steeply lowered in a range in which the length L13 of the first overhang 511c is equal to or less than 30 µm (that is, L13 0.3×L19) and the stress is lowered gently in a range in which the length L13 is greater than 30 µm (that is, L13>0.3×L19). From the graph, it can be understood that the length L13 of the first overhang 511c is preferably in a range about 30 µm including 30 µm (that is, L13=0.3×L19), that is, as described above, equal to or greater than 0.2×L19 and equal to or less than 0.4×L19 to yield excellent stress alleviation characteristics while preventing the excessive increase in the size of the first overhang 511c.

In the embodiment, the support body 511, support base 413, and support base 423 each include the first overhang, but at least one of the support body 511, support base 413, and support base 423 may include the first overhang. That is, one or two of the first overhangs 511c, 413c, and 423c may be omitted.

As illustrated in FIG. 3, the length L11 of the first bonded surface 511a in the Y axis direction (a direction perpendicular to the X axis direction which is the alignment direction of the support body 511 and the suspension arm 512) is longer than the length L12 of the suspension arm 512. Thus, it is possible to inhibit thermal stress occurring in the structure near the first bonded surface 511a from being delivered to the suspension arm 512 while maintaining the bonding strength of the support body 511 and the mount 22 sufficiently high. Similarly, a length L21 of the first bonded surface 413a in the Y axis direction is longer than a length L22 of the suspension beam 411. Thus, it is possible to inhibit thermal stress occurring in the structure near the first bonded surface 413a from being delivered to the suspension beam 411 while maintaining the bonding strength of the support base 413 and the mount 22 sufficiently high. Similarly, a length L31 of the first bonded surface 423a in the Y axis direction is longer than a length L32 of the suspension beam 421. Thus, it is possible to inhibit thermal stress occurring in the structure near the first bonded surface 423a from being delivered to the suspension beam 421 while maintaining the bonding strength of the support base 423 and the mount 22 sufficiently high. Therefore, in the physical quantity sensor 1, it is possible to suppress the deterioration in the temperature characteristics more efficiently.

In the support 51, a relation between the length L11 of the first bonded surface 511a and the length L12 of the suspension arm 512 is not particularly limited. L11=L12 may be satisfied or L11<L12 may be satisfied. In the first fixed electrode 41, a relation between the length L21 of the first bonded surface 413a and the length L22 of the suspension beam 411 is not particularly limited. L21=L22 may be satisfied or L21<L22 may be satisfied. In the second fixed electrode 42, a relation between the length L31 of the first bonded surface 423a and the length L32 of the suspension beam 421 is not particularly limited. L31=L32 may be satisfied or L31<L32 may be satisfied.

As illustrated in FIG. 3, the support body 511 includes the second overhang 511d that is located opposite (on the negative side of the X axis direction) to the first overhang 511c with respect to the first bonded surface 511a and is separated from the base 2. Since the second overhang 511d can also absorb and alleviate the thermal stress occurring in the structure near the first bonded surface 511a, the thermal stress occurring in the structure near the first bonded surface 511a is rarely delivered to the suspension arm 512. Similarly, the support base 413 includes a second overhang 413d that is located opposite (on the negative side of the X axis direction) to the first overhang 413c with respect to the first bonded surface 413a and is separated from the base 2. Since the second overhang 413d can also absorb and alleviate the thermal stress occurring in the structure near the first bonded surface 413a, the thermal stress occurring in the structure near the first bonded surface 413a is rarely delivered to the suspension beam 411. Similarly, the support base 423 includes a second overhang 423d that is located opposite (on the negative side of the X axis direction) to the first overhang 423c with respect to the first bonded surface 423a and is separated from the base 2. Since the second overhang 423d can also absorb and alleviate the thermal stress occurring in the structure near the first bonded surface 423a, the thermal stress occurring in the structure near the first bonded surface 423a is rarely delivered to the suspension beam 421. Therefore, in the physical quantity sensor 1, it is possible to suppress the deterioration in the temperature characteristics more efficiently.

The support body 511 may not include the second overhang 511d. Similarly, the support base 413 may not include the second overhang 413d and the support base 423 may not include the second overhang 423d.

As illustrated in FIG. 3, the length L13 of the first overhang 511c in the X direction (the alignment direction of the first overhang 511c and the second overhang 511d) is longer than the length L14 of the second overhang 511d. Thus, it is possible to suppress an increase in the size of the second overhang 511d while efficiently suppressing the delivery of thermal stress to the suspension arm 512. Similarly, the length L23 of the first overhang 413c in the X direction (the alignment direction of the first overhang 413c and the second overhang 413d) is longer than the length L24 of the second overhang 413d. Thus, it is possible to suppress an increase in the size of the second overhang 413d while efficiently suppressing the delivery of thermal stress to the suspension beam 411. Similarly, the length L33 of the first overhang 423c in the X direction (the alignment direction of the first overhang 423c and the second overhang 423d) is longer than the length L34 of the second overhang 423d. Thus, it is possible to suppress an increase in the size of the second overhang 423d while suppressing the delivery of thermal stress to the suspension beam 421 efficiently. Therefore, in the physical quantity sensor 1, it is possible to suppress the deterioration in the temperature characteristics more efficiently while suppressing an increase in the size.

In the support 51, a relation between the length L13 of the first overhang 511c and the length L14 of the second overhang 511d is not particularly limited. L13=L14 may be satisfied or L13<L14 may be satisfied. In the first fixed electrode 41, a relation between the length L23 of the first overhang 413c and the length L24 of the second overhang 413d is not particularly limited either. L23=L24 may be satisfied or L23<L24 may be satisfied. In the second fixed electrode 42, a relation between the length L33 of the first overhang 423c and the length L34 of the second overhang 423d is also not particularly limited. L33=L34 may be satisfied or L33<L34 may be satisfied.

As illustrated in FIG. 3, in the support body 511, the first bonded surface 511a includes a notch 511a', and the second bonded surface 511b is disposed in the notch 511a'. In this configuration, it is possible to achieve miniaturization of the support body 511 while maintaining the first bonded surface 511a and the second bonded surface 511b sufficiently largely. Similarly, in the support base 413, the first bonded surface 413a includes a notch 413a', and the second bonded surface 413b is disposed in the notch 413a'. In this configuration, it is possible to achieve miniaturization of the support base 413 while maintaining the first bonded surface 413a and the second bonded surface 413b sufficiently largely. Similarly, in the support base 423, the first bonded surface 423a includes a notch 423a', and the second bonded surface 423b is disposed in the notch 423a'. In this configuration, it is possible to achieve miniaturization of the support base 423 while maintaining the first bonded surface 423a and the second bonded surface 423b sufficiently largely. Therefore, the bonding strength of the base 2 and the sensor element 3 (the support bases 511, 413, and 423) can be sufficiently high, a more excellent electric connection between the sensor element 3 and the wirings 71, 72, and 73 can be achieved, and the miniaturization of the physical quantity sensor 1 can also be achieved.

The first bonded surface 511a may not include the notch 511a'. Similarly, the first bonded surface 413a may not include the notch 413a' and the first bonded surface 423a may not include the notch 423a'.

As illustrated in FIG. 3, in the support body 511, the first bonded surface 511a extends to an outer edge of the support body 511 in the plan view in the Z axis direction. Specifically, both ends of the first bonded surface 511a in the Y axis direction are aligned with the outer edge of the support body 511 in the plan view in the Z axis direction. In this configuration, since the length of the first bonded surface 511a in the Y axis direction can be made longer, the first bonded surface 511a can be large without increasing the support body 511 and while maintaining the sizes of the first overhang 511c and the second overhang 511d. Therefore, it is possible to increase the bonding strength of the support body 511 and the mount 22. Here, if desired, only one end of the first bonded surface 511a in the Y axis direction may align with the outer edge of the support body 511 or neither end of the first bonded surface 511a in the Y axis direction may align with the outer edge of the support body 511.

Similarly, in the support base 413, the first bonded surface 413a extends to an outer edge of the support base 413 in the plan view in the Z axis direction. Specifically, the end of the first bonded surface 413a on the negative side of the Y axis direction is aligned with the outer edge of the support base 413 in the plan view in the Z axis direction. In this configuration, since the length of the first bonded surface 413a in the Y axis direction can be made longer, the first bonded surface 413a can be large without increasing the support base 413 and while maintaining the sizes of the first overhang 413c and the second overhang 413d. Therefore, it is possible to increase the bonding strength of the support base 413 and the mount 22. Here, both ends of the first bonded surface 413a in the Y axis direction may align with the outer edge of the support base 413 or neither end of the first bonded surface 413a in the Y axis direction may align with the outer edge of the support base 413.

Similarly, in the support base 423, the first bonded surface 423a extends to an outer edge of the support base 423 in the plan view in the Z axis direction. Specifically, the end of the first bonded surface 423a on the positive side of the Y axis direction aligns with the outer edge of the support base 423 in the plan view in the Z axis direction. In this configuration, since the length of the first bonded surface 423a in the Y axis direction can be made longer, the first bonded surface 423a can be large without increasing the support base 423 and while maintaining the sizes of the first overhang 423c and the second overhang 423d. Therefore, it is possible to increase the bonding strength of the support base 423 and the mount 22. Here, both ends of the first bonded surface 423a in the Y axis direction may align with the outer edge of the support base 423 or neither end of the first bonded surface 423a in the Y axis direction may align with the outer edge of the support base 423.

Second Embodiment

Next, a physical quantity sensor according to a second embodiment of the invention will be described.

Figure 7:
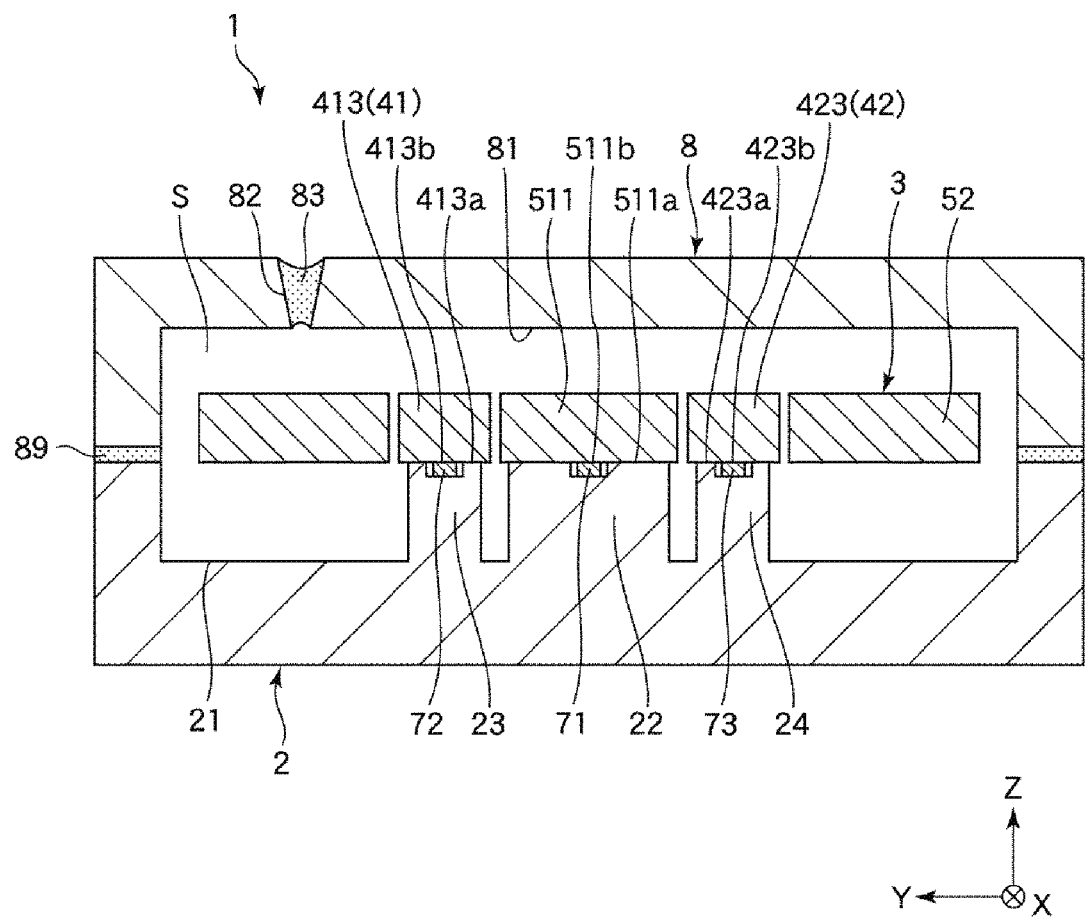
FIG. 7 is a sectional view illustrating a physical quantity sensor according to a second embodiment of the invention.
Figure 8:
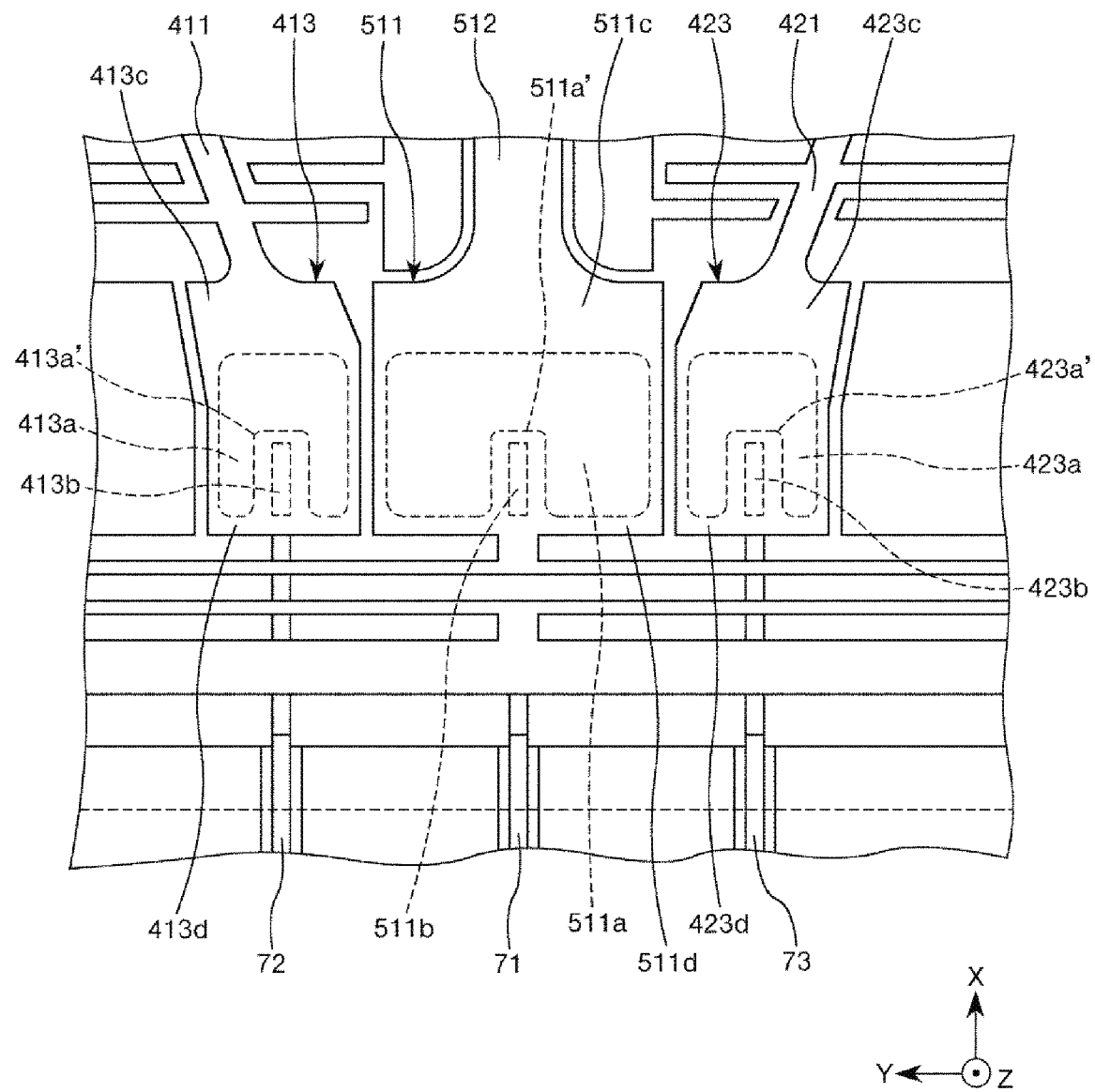
FIG. 8 is a partially enlarged plan view illustrating the physical quantity sensor illustrated in FIG. 7.

FIG. 7 is a sectional view illustrating the physical quantity sensor according to the second embodiment of the invention. FIG. 8 is a partially enlarged plan view illustrating the physical quantity sensor illustrated in FIG. 7.

A physical quantity sensor 1 according to the second embodiment is mainly the same as the physical quantity sensor 1 according to the above-described first embodiment except that the configurations of first bonded surfaces 511a, 413a, and 423a are different.

In the following description, in the physical quantity sensor 1 according to the second embodiment, differences from the above-described first embodiment will be mainly described and the redundant features will not be described. In FIGS. 7 and 8, the same reference numerals are given to the same elements as those of the above-described first embodiment.

As illustrated in FIG. 7, the base 2 includes three mounts 22, 23, and 24 upstanding in the depression 21. The mounts 22, 23, and 24 can also be said to be mounts obtained by dividing the mount 22 according to the above-described first embodiment into three pieces in the Y axis direction. The wiring 71 is extracted to the mount 22, the wiring 72 is extracted to the mount 23, and the wiring 73 is extracted to the mount 24. The support body 511 is bonded to the mount 22, the support base 413 is bonded to the mount 23, and the support base 423 is bonded to the mount 24.

As illustrated in FIG. 8, in the support body 511, the entire circumference of the first bonded surface 511a is surrounded by the support body 511 in the plan view in the Z axis direction. That is, the first bonded surface 511a does not extend to the outer edge of the support body 511 in the plan view in the Z axis direction. In this configuration, for example, even when mask shift occurs and a position of the support body 511 formed in the mount 22 is shifted from a predetermined desired position at the time of patterning a silicon substrate bonded to the base 2 to form the sensor element 3, the circumference portion of the first bonded surface 511a allows the shift. Thus, it is possible to suppress a decrease in the area of the first bonded surface 511a. Therefore, it is possible to maintain the bonding strength of the support body 511 and the mount 22.

Similarly, in the support base 413, the entire circumference of the first bonded surface 413a is surrounded by the support base 413 in the plan view in the Z axis direction. In this configuration, as in the above-described support body 511, even when mask shift occurs, it is possible to maintain the bonding strength of the support base 413 and the mount 23.

Similarly, in the support base 423, the entire circumference of the first bonded surface 423a is surrounded by the support base 423 in the plan view in the Z axis direction. In this configuration, as in the above-described support body 511, even when mask shift occurs, it is possible to maintain the bonding strength of the support base 423 and the mount 24.

In the support body 511, the first bonded surface 511a has rounded corners. More specifically, the first bonded surface 511a has a substantially rectangular form except for the notch 511a' in the plan view in the Z axis direction and each corner is rounded. In this configuration, since stress concentration on the corners of the first bonded surface 511a is suppressed, for example, the support body 511 can be prevented from being exfoliated (delaminating) from the mount 22 (the base 2) because of the corner becoming a trigger or a crack can be prevented from being formed in the support body 511.

Similarly, in the support base 413, the first bonded surface 413a has rounded corners. More specifically, the first bonded surface 413a has a substantially rectangular form except for the notch 413a' in the plan view in the Z axis direction and each corner is rounded. In this configuration, since stress concentration on the corners of the first bonded surface 413a is suppressed, for example, the support base 413 can be prevented from being exfoliated from the mount 23 because of the corner becoming a trigger or a crack can be prevented from being formed in the support base 413.

Similarly, in the support base 423, the first bonded surface 423a has rounded corners. More specifically, the first bonded surface 423a has a substantially rectangular form except for the notch 423a' in the plan view in the Z axis direction and each corner is rounded. In this configuration, since stress concentration on the corners of the first bonded surface 423a is suppressed, for example, the support base 423 can be prevented from being exfoliated from the mount 24 because of the corner becoming a trigger or a crack can be prevented from being formed in the support base 423.

Therefore, in this configuration, the physical quantity sensor 1 has high mechanical strength.

Even in the second embodiment, it is possible to obtain the same effects as those of the above-described first embodiment.

Third Embodiment

Next, a physical quantity sensor according to a third embodiment of the invention will be described.

Figure 9:
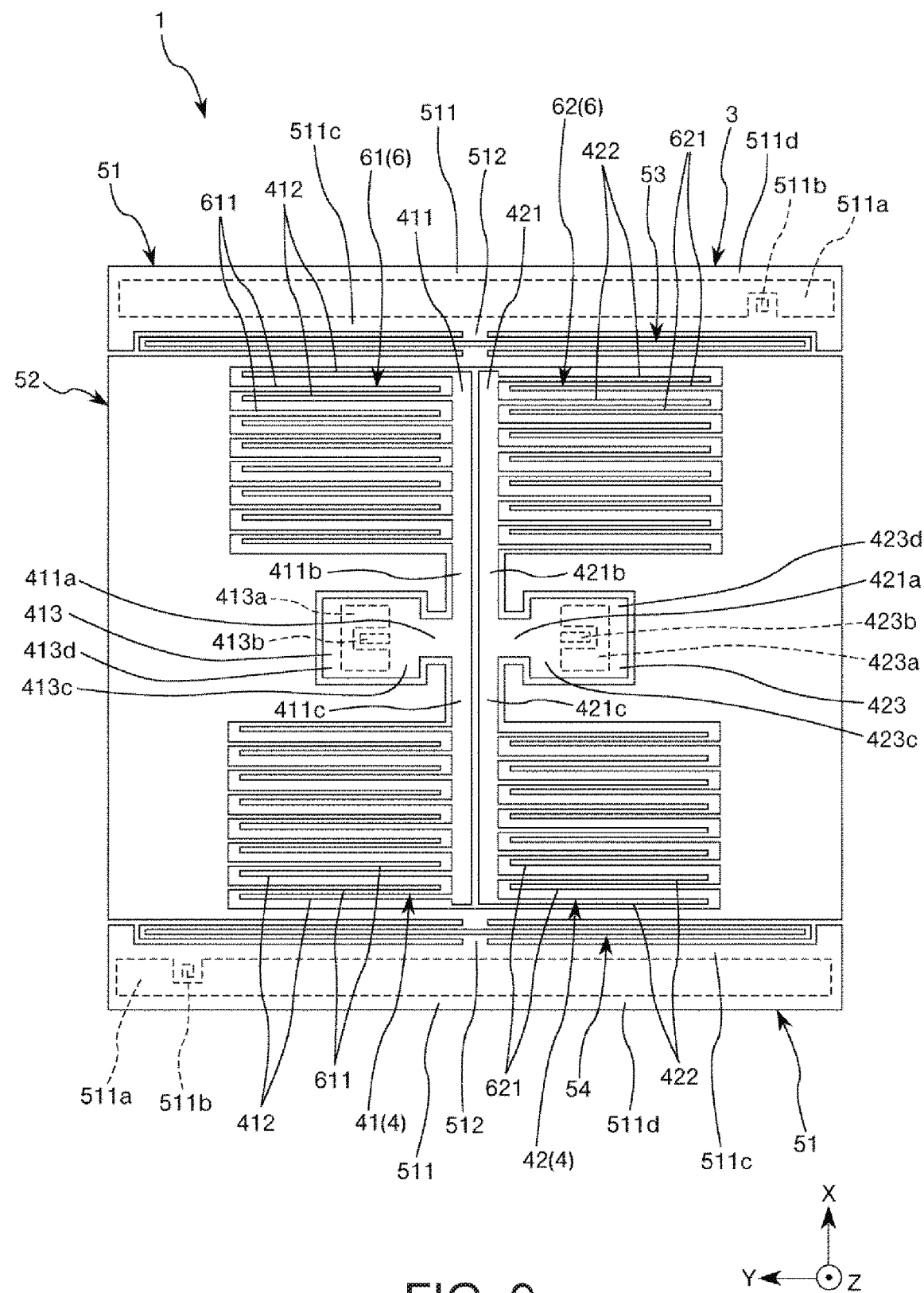
FIG. 9 is a plan view illustrating a physical quantity sensor according to a third embodiment of the invention.

FIG. 9 is a plan view illustrating the physical quantity sensor according to the third embodiment of the invention. In FIG. 9, to facilitate the description, the base, the cover, and the wirings are not illustrated and only the sensor element is illustrated.

A physical quantity sensor 1 according to the embodiment is mainly the same as the physical quantity sensor 1 according to the above-described first embodiment except that the configuration of the sensor element 3 is different.

In the following description, in the physical quantity sensor 1 according to the third embodiment, differences from the above-described second embodiment will be mainly described and redundant features will not be described. In FIG. 9, the same reference numerals are given to the same elements as those of the above-described first embodiment.

As illustrated in FIG. 9, in the embodiment, the supports 51 are installed outside of the movable member 52. One pair of supports 51 is installed to be aligned in the X axis direction to interpose the movable member 52 therebetween. Although not illustrated, one pair of mounts 22 is also installed to correspond to the one pair of the supports 51. The support 51 located on the positive side of the X axis direction is connected to the movable member 52 via the spring 53 and the support 51 located on the negative side of the X axis direction is connected to the movable member 52 via the spring 54.

Each support 51 includes the support body 511 and the suspension arm 512, as in the above-described second embodiment. Each support 511 includes the first bonded surface 511a bonded to the mount 22, the second bonded surface 511b bonded to the wiring 71, the first overhang 511c, and the second overhang 511d.

The first fixed electrode 41 includes the support base 413, the suspension beam 411, and the first fixed electrode fingers 412, as in the above-described second embodiment. The suspension beam 411 includes a span 411a extending from the support base 413 on the negative side of the Y axis direction and spans 411b and 411c extending from the front end of the span 411a on both sides of the X axis direction. The plurality of first fixed electrode fingers 412 extend from the spans 411b and 411c on the positive side of the Y axis direction. The support base 413 includes a first bonded surface 413a bonded to the mount 23, a second bonded surface 413b bonded to the wiring 72, a first overhang 413c disposed between the first bonded surface 413a and the portion 411a, and a second overhang 413d disposed opposite to the first overhang 413c with respect to the first bonded surface 413a.

The second fixed electrode 42 includes the support base 423, the suspension beam 421, and the second fixed electrode fingers 422, as in the above-described second embodiment. The suspension beam 421 includes a span 421a extending from the support base 423 on the positive side of the Y axis direction and spans 421b and 421c extending from the front end of the span 421a on both sides of the X axis direction. The plurality of second fixed electrode fingers 422 extend from the spans 421b and 421c on the negative side of the Y axis direction. The support base 423 includes a first bonded surface 423a bonded to the mount 24, a second bonded surface 423b bonded to the wiring 73, a first overhang 423c disposed between the first bonded surface 423a and the span 421a, and a second overhang 423d disposed opposite to the first overhang 423c with respect to the first bonded surface 423a.

Even in the third embodiment, it is possible to obtain the same effects as those of the above-described first embodiment. In particular, in the embodiment, since one pair of supports 51 is installed outside of the movable member 52, it is possible to more stably support the movable member 52. Therefore, an attitude and behavior of the movable member 52 are further stabilized, and thus it is possible to detect the acceleration Ax with higher precision.

Fourth Embodiment

Next, a physical quantity sensor device according to a fourth embodiment of the invention will be described.

Figure 10:
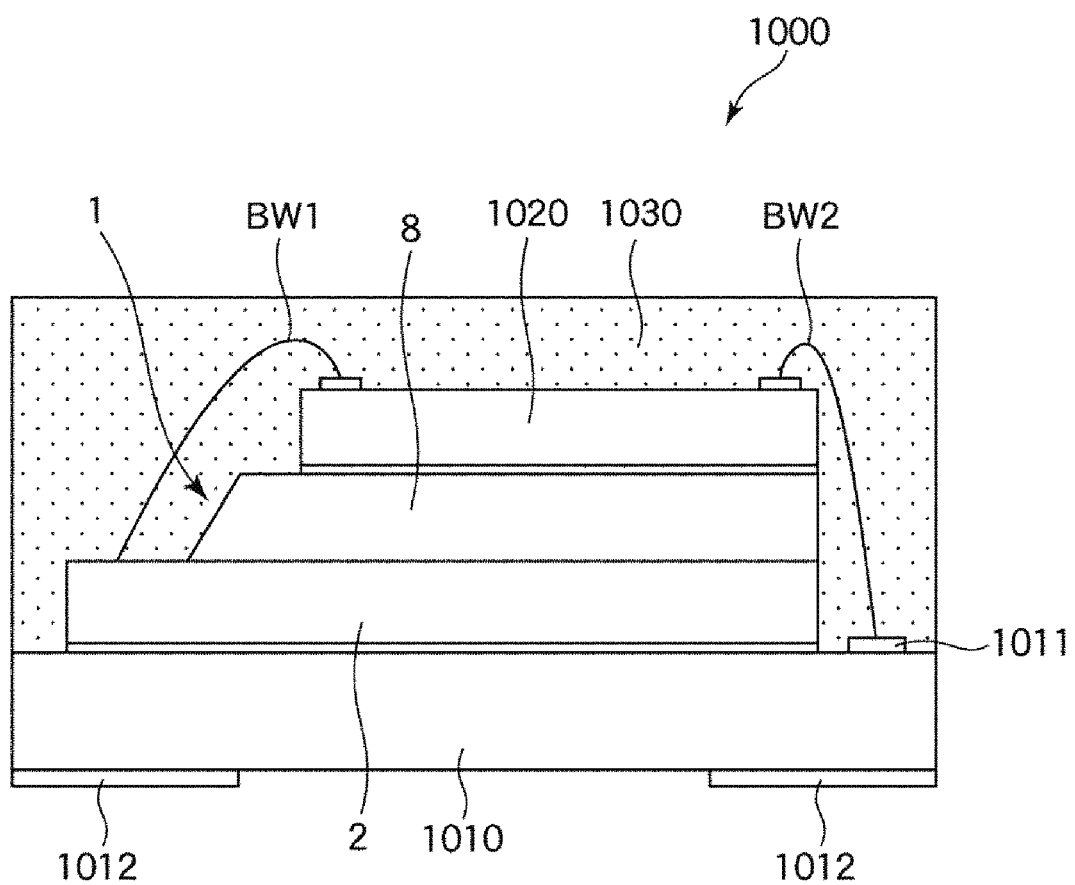
FIG. 10 is a sectional view illustrating a physical quantity sensor device according to a fourth embodiment of the invention.

FIG. 10 is a sectional view illustrating the physical quantity sensor device according to the fourth embodiment of the invention. As illustrated in FIG. 10, a physical quantity sensor device 1000 includes a base substrate 1010, a physical quantity sensor 1 installed on the base substrate 1010, a circuit element 1020 (IC) installed on the physical quantity sensor 1, a bonding wire BW1 electrically connecting the physical quantity sensor 1 to the circuit element 1020, a bonding wire BW2 electrically connecting the base substrate 1010 to the circuit element 1020, and a molded body 1030 molded over the physical quantity sensor 1 and the circuit element 1020. Here, any of the physical quantity sensors according to the above-described first to third embodiment can be used as the physical quantity sensors 1.

The base substrate 1010 is a substrate that supports the physical quantity sensor 1 and is, for example, an interposer substrate. A plurality of connection terminals 1011 are disposed on the upper surface of the base substrate 1010 and a plurality of mount terminals 1012 are disposed on the lower surface of the base substrate 1010. Internal wirings (not illustrated) are disposed in the base substrate 1010. The connection terminals 1011 are electrically connected to the corresponding mount terminals 1012 via the internal wirings. The base substrate 1010 is not particularly limited. For example, a silicon substrate, a ceramic substrate, a resin substrate, a glass substrate, or a glass epoxy substrate can be used.

The physical quantity sensor 1 is disposed on the base substrate 1010 so that the base 2 is oriented on the lower side (the side of the base substrate 1010). The physical quantity sensor 1 is bonded to the base substrate 1010 via a bonding member.

The circuit element 1020 is disposed on the physical quantity sensor 1. The circuit element 1020 is bonded to the cover 8 of the physical quantity sensor 1 via the bonding member. The circuit element 1020 is electrically connected to the wirings 71, 72, and 73 of the physical quantity sensor 1 via the bonding wire BW1 and is electrically connected to the connection terminals 1011 of the base substrate 1010 via the bonding wire BW2. The circuit element 1020 includes a driving circuit that drives the physical quantity sensor 1, a detection circuit that detects acceleration based on an output signal from the physical quantity sensor 1, or an output circuit that converts a signal from the detection circuit into a predetermined signal and outputs the predetermined signal, as desired.

The molded body 1030 is molded over the physical quantity sensor 1 and the circuit element 1020. Thus, it is possible to protect the physical quantity sensor 1 or the circuit element 1020 from moisture, dust, shock, or the like. The molded body 1030 is not particularly limited. For example, a heat-curable epoxy resin can be used. For example, molding can be performed in accordance with a transfer molding method.

The foregoing physical quantity sensor device 1000 includes the physical quantity sensor 1. Therefore, it is possible to obtain the effects of the physical quantity sensor 1 and it is possible to obtain the physical quantity sensor device 1000 with high reliability.

The configuration of the physical quantity sensor device 1000 is not limited to the foregoing configuration. For example, the physical quantity sensor 1 may be configured to be accommodated in a ceramic package.

Fifth Embodiment

Next, an electronic apparatus according to a fifth embodiment of the invention will be described.

Figure 11:
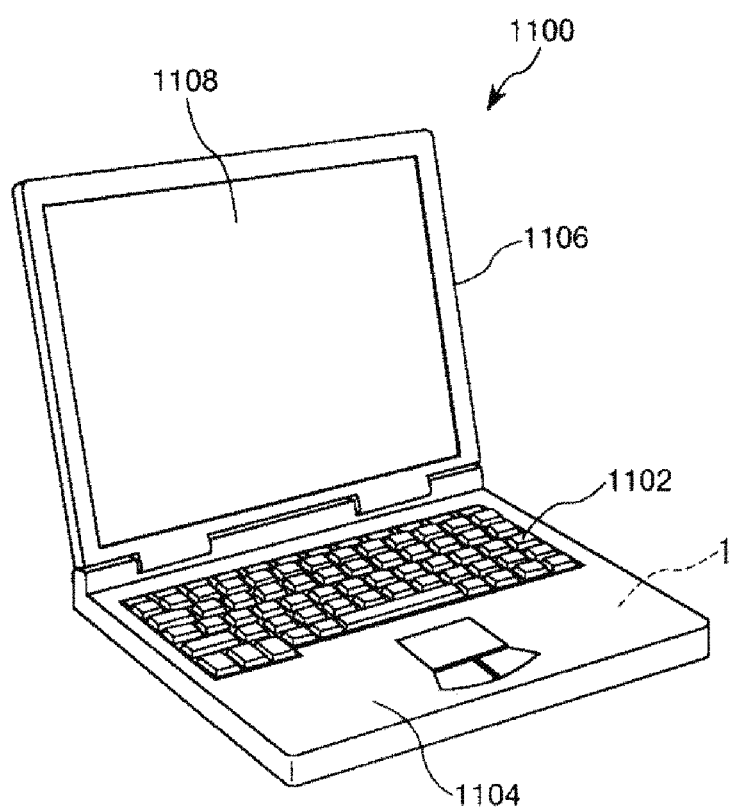
FIG. 11 is a perspective view illustrating an electronic apparatus according to a fifth embodiment of the invention.

FIG. 11 is a perspective view illustrating the electronic apparatus according to the fifth embodiment of the invention.

A mobile (or notebook-type) personal computer 1100 illustrated in FIG. 11 is an example of an electronic apparatus that includes the physical quantity sensor according to the invention. In the drawing, the personal computer 1100 is configured to include a body 1104 including a keyboard 1102 and a display lid 1106 including a display 1108. The display lid 1106 is supported to be rotatable via a hinge structure unit with respect to the body 1104. The personal computer 1100 contains the physical quantity sensor 1 that functions as an acceleration sensor. Here, any of the physical quantity sensors according to the first to third embodiments can be used as the physical quantity sensor 1.

The personal computer 1100 (an electronic apparatus) includes the physical quantity sensor 1. Therefore, it is possible to obtain the effects of the above-described physical quantity sensor 1, and thus it is possible to achieve high reliability.

Sixth Embodiment

Next, an electronic apparatus according to a sixth embodiment of the invention will be described.

Figure 12:
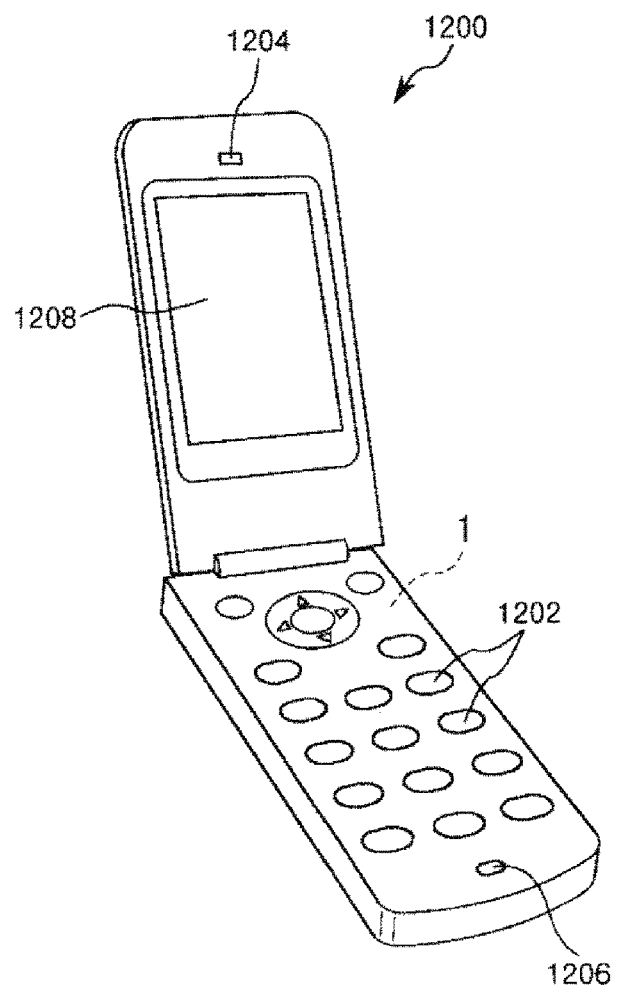
FIG. 12 is a perspective view illustrating an electronic apparatus according to a sixth embodiment of the invention.

FIG. 12 is a perspective view illustrating the electronic apparatus according to the sixth embodiment of the invention.

A mobile phone 1200 (also including a PHS) illustrated in FIG. 12 is an example of an electronic apparatus that includes the physical quantity sensor according to the invention. In the drawing, the mobile phone 1200 includes an antenna (not illustrated), a plurality of operation buttons 1202, an earpiece 1204, and a mouth piece 1206. A display 1208 is disposed between the operation buttons 1202 and the earpiece 1204. The mobile phone 1200 contains the physical quantity sensor 1 that functions as an acceleration sensor. Here, any of the physical quantity sensors according to the above-described first to third embodiment can be used as the physical quantity sensors 1.

The mobile phone 1200 (an electronic apparatus) includes the physical quantity sensor 1. Therefore, it is possible to obtain the effects of the above-described physical quantity sensor 1, and thus it is possible to achieve high reliability.

Seventh Embodiment

Next, an electronic apparatus according to a seventh embodiment of the invention will be described.

Figure 13:
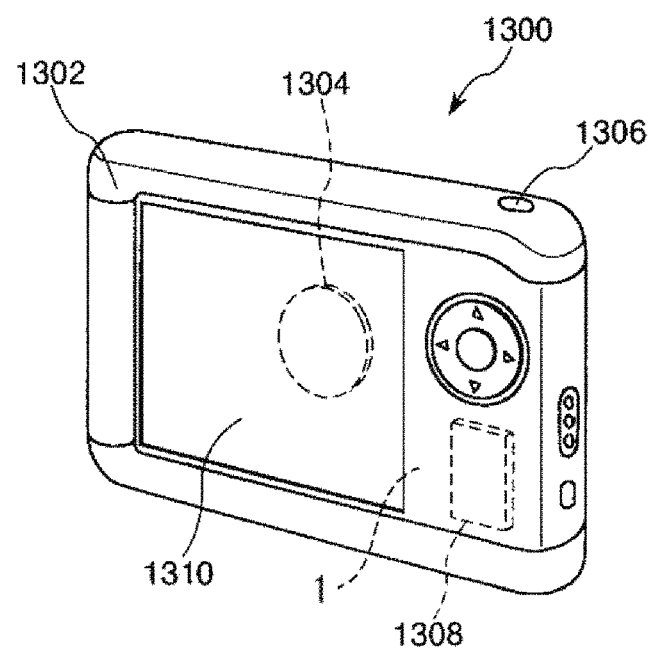
FIG. 13 is a perspective view illustrating an electronic apparatus according to a seventh embodiment of the invention.

FIG. 13 is a perspective view illustrating the electronic apparatus according to the seventh embodiment of the invention.

A digital still camera 1300 illustrated in FIG. 13 is an example of an electronic apparatus that includes the physical quantity sensor according to the invention. In the drawing, a display 1310 is installed on the rear surface of a case (body) 1302 and is configured to perform display based on an imaging signal by a CCD. The display 1310 functions as a finder that displays a subject as an electronic image. A light-receiver 1304 including an optical lens (an imaging optical system) or a CCD is installed on the front surface side (the rear surface side in the drawing) of the case 1302. When a photographer confirms a subject image displayed on the display 1310 and presses a shutter button 1306, an imaging signal of the CCD at that time point is transferred and stored in the memory 1308. The digital still camera 1300 contains the physical quantity sensor 1 that functions as an acceleration sensor. Here, any of the physical quantity sensors according to the above-described first to third embodiment can be used as the physical quantity sensors 1.

The digital still camera 1300 (an electronic apparatus) includes the physical quantity sensor 1. Therefore, it is possible to obtain the effects of the above-described physical quantity sensor 1, and thus it is possible to achieve high reliability.

The electronic apparatus according to the invention can be applied not only to the above-described personal computer, the above-described mobile phone, and the digital still camera according to the embodiment, but also to, for example, a smartphone, a tablet terminal, a timepiece (including a smart timepiece), an ink jet ejection apparatus (for example, an ink jet printer), a laptop personal computer, a television, a wearable terminal such as a head-mounted display (HMD), a video camera, a video tape recorder, a car navigation apparatus, a pager, an electronic organizer (also including a communication function unit), an electronic dictionary, a calculator, an electronic game apparatus, a word processor, a workstation, a television telephone, a security television monitor, electronic binoculars, a POS terminal, a medical apparatus (for example, an electronic thermometer, a blood-pressure meter, a blood-sugar meter, an electrocardiographic apparatus, an ultrasonic diagnostic apparatus, or an electronic endoscope), a fish finder, various measurement apparatuses, a mobile terminal base station apparatus, meters (for example, meters for cars, airplanes, and ships), a flight simulator, and a network server.

Eighth Embodiment

Next, a vehicle according to an eighth embodiment of the invention will be described.

Figure 14:
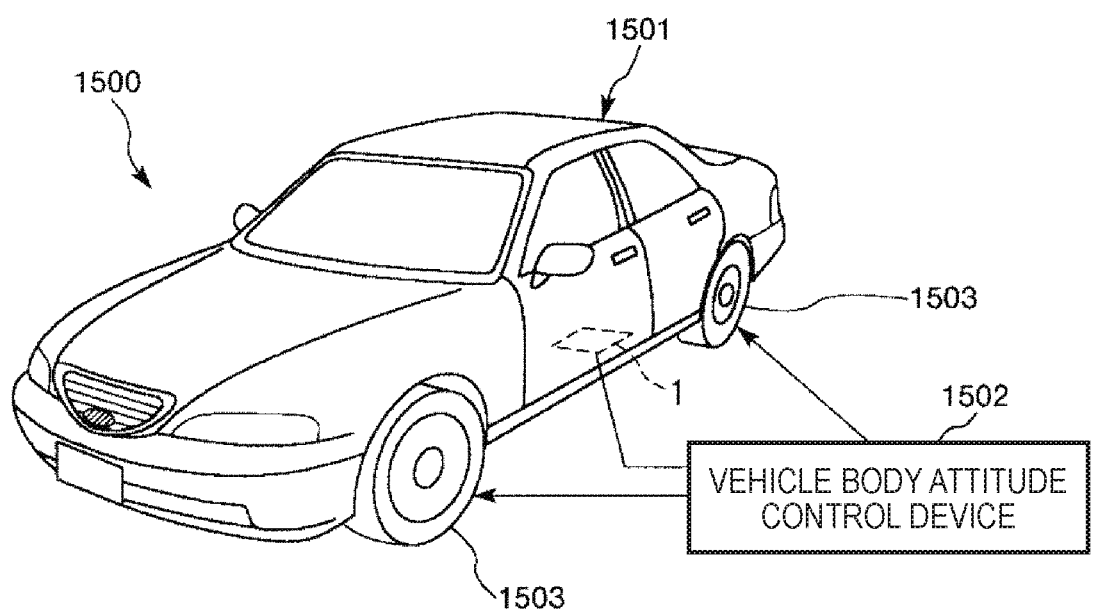
FIG. 14 is a perspective view illustrating a vehicle according to an eighth embodiment of the invention.

FIG. 14 is a perspective view illustrating the vehicle according to the eighth embodiment of the invention.

An automobile 1500 illustrated in FIG. 14 is an automobile to which the physical quantity sensor according to the invention is applied. In the drawing, the automobile 1500 contains the physical quantity sensor 1 that functions as an acceleration sensor. Thus, the physical quantity sensor 1 can detect an attitude of a vehicle body 1501. A detection signal of the physical quantity sensor 1 is supplied to a vehicle body attitude control device 1502. Then, the vehicle body attitude control device 1502 detects an attitude of the vehicle body 1501 based on the detection signal and can control hardness or softness of a suspension in accordance with a detection result or controls the braking of an individual wheel 1503. Here, any of the physical quantity sensors according to the above-described first to third embodiment can be used as the physical quantity sensors 1.

The automobile 1500 (a vehicle) includes the physical quantity sensor 1. Therefore, it is possible to obtain the effects of the above-described physical quantity sensor 1, and thus it is possible to achieve high reliability.

The physical quantity sensor 1 can also be broadly applied to a car navigation system, a car air conditioner, an antilock brake system (ABS), an air bag, a tire pressure monitoring system (TPMS), an engine control, and an electronic control unit (ECU) such as a battery monitor of a hybrid automobile or an electric automobile.

The vehicle is not limited to the automobile 1500, but can also be, for example, an airplane, a ship, an AGV (an unmanned carrier), a bipedal walking robot, and an unmanned aircraft such as a drone.

The physical quantity sensor, the physical quantity sensor device, the electronic apparatus, and the vehicle according to the invention have been described according to the illustrated embodiments, but the invention is not limited thereto. The configurations described above can be substituted with any configuration with the same function. Any other constituent may be added to the invention. The above-described embodiments may be appropriately combined. In the above-described embodiments, the X and Y axis directions are perpendicular to each other, but the invention is not limited thereto. The X and Y axis directions may intersect each other.

In the above-described embodiments, the configuration of one sensor element has been described, but the number of element units may be plural. At this time, by disposing the plurality of element units so that detection axes are different from each other, it is possible to detect acceleration in a plurality of axis directions.

In the above-described embodiments, the acceleration sensor detecting acceleration has been described as the physical quantity sensor, but a physical quantity detected by the physical quantity sensor is not limited to acceleration.

The entire disclosure of Japanese Patent Application No. 2016-237917 filed Dec. 7, 2016 is expressly incorporated herein by reference.

What is claimed is:

1. A physical quantity sensor comprising:
   three mutually orthogonal axes being defined as an X-axis, a Y-axis, and a Z-axis;
   a base having first and second surfaces opposite to each other and orthogonal to a direction along the Z-axis;
   a first support having a first bonded area that is bonded to the first surface of the base, the first support having first and second sides opposite to each other along the X-axis;
   a first suspension beam connected to the first side of the first support;
   a second support having a second bonded area that is bonded to the first surface of the base, the first and second supports being arranged along the Y-axis, the second support having third and fourth sides opposite to each other along the X-axis;
   a second suspension beam connected to the third side of the second support;

a movable electrode connected to the first suspension beam, the movable electrode having a movable electrode finger, the movable electrode finger extending along the Y-axis; and a fixed electrode connected to the second suspension beam, the fixed electrode having a fixed electrode finger, the fixed electrode finger extending along the Y-axis, the fixed electrode finger facing the moveable electrode finger along the X-axis, wherein the first side of the first support and the third side of the second support are located at the same sides along the X-axis with respect to the first and second supports, and the second side of the first support and the fourth side of the second support are located at the same sides along the X-axis with respect to the first and second supports, the first support has a first overhang located at the first side of the first support, the first overhang is located between the first bonded area and the first suspension beam in a plan view along the Z-axis, and the first overhang is spaced apart from the first surface of the base, and the second support has a second overhang located at the third side of the second support, the second overhang is located between the second bonded area and the second suspension beam in the plan view along the Z-axis, and the second overhang is spaced apart from the first surface of the base.

2. The physical quantity sensor according to claim 1, wherein the first support has a third overhang located at the second side of the first support, the third overhang is laterally shifted from the first bonded area in the plan view along the Z-axis, and the third overhang is spaced apart from the first surface of the base.

3. The physical quantity sensor according to claim 2, wherein the second support has a fourth overhang located at the fourth side of the second support, the fourth overhang is laterally shifted from the second bonded area in the plan view along the Z-axis, and the fourth overhang is spaced apart from the first surface of the base.

4. The physical quantity sensor according to claim 3, wherein a length along the X-axis of the second overhang is longer than a length along the X-axis of the fourth overhang.

5. The physical quantity sensor according to claim 2, wherein a length along the X-axis of the first overhang is longer than a length along the X-axis of the third overhang.

6. The physical quantity sensor according to claim 1, wherein when a length along the X-axis of the first overhang is L13 and a length along the X-axis of the first support is L19, $0.2 \times L19 \leq L13 \leq 0.4 \times L19$.

7. The physical quantity sensor according to claim 1, wherein a length along the X-axis of the first bonded area is L18 and a length along the X-axis of the first support is L19, $0.4 \times L19 \leq L18 \leq 0.7 \times L19$.

8. The physical quantity sensor according to claim 1, wherein a length along the Y-axis of the first bonded area is L11 and a length along the Y-axis of the first suspension beam is L12, $L12 \leq L11$.

9. The physical quantity sensor according to claim 1, wherein a length along the Y-axis of the second bonded area is L21 and a length along the Y-axis of the second suspension beam is L22, $L22 \leq L21$.

10. The physical quantity sensor according to claim 1, wherein at least one of corners of the first and second bonded area is rounded in the plan view along the Z-axis.

11. The physical quantity sensor according to claim 1, wherein the first bonded area includes a part of a periphery of the first support in the plan view along the Z-axis.

12. The physical quantity sensor according to claim 1, wherein a first wiring and a second wiring are disposed on the first surface of the base, the first support has a third bonded area that is bonded to the first wiring, and the second support has a fourth bonded area that is bonded to the second wiring.

13. The physical quantity sensor according to claim 12, wherein the first bonded area has a first notch, and the third bonded area is located at the first notch in the plan view along the Z-axis.

14. The physical quantity sensor according to claim 13, wherein the second bonded area has a second notch, and the fourth bonded area is located at the second notch in the plan view along the Z-axis.

15. The physical quantity sensor according to claim 14, wherein the first surface of the base has a projection, and the first bonded area, the second bonded area, the third bonded area, and the fourth bonded area are bonded to the projection.

16. The physical quantity sensor according to claim 15, wherein a top surface of the projection has first and second areas, and the first area is located closer to the second surface of the base than the second area, the first wiring is disposed on the first area and the first surface of the base, the first bonded area of the first support is bonded to the second area of the projection, and the third bonded area of the first support is bonded to the first area of the projection via the first wiring.

17. A physical quantity sensor device comprising:
the physical quantity sensor according to claim 1; and
a circuit element that is electrically connected to the physical quantity sensor.

18. An electronic apparatus comprising:
the physical quantity sensor according to claim 1; and
a body housing the physical quantity sensor.

19. A vehicle comprising: the physical quantity sensor according to claim 1; and an attitude control device configured to detect an attitude of the vehicle in response to a signal output from the physical quantity sensor and control the vehicle based on the detected attitude.

* * * * *